United States Patent
Nelson

(10) Patent No.: US 9,812,927 B2
(45) Date of Patent: Nov. 7, 2017

(54) ELECTRO-MECHANICAL DYNAMO FOR C AND D BATTERY REPLACEMENT

(71) Applicant: Bradley Nelson, Port Jefferson Station, NY (US)

(72) Inventor: Bradley Nelson, Port Jefferson Station, NY (US)

( * ) Notice: Subject to any disclaimer, the term of this patent is extended or adjusted under 35 U.S.C. 154(b) by 823 days.

(21) Appl. No.: 14/289,419

(22) Filed: May 28, 2014

(65) Prior Publication Data

US 2015/0349607 A1    Dec. 3, 2015

(51) Int. Cl.
*H02K 7/18*    (2006.01)

(52) U.S. Cl.
CPC ......... *H02K 7/1853* (2013.01); *H02K 7/1861* (2013.01); *Y10T 307/406* (2015.04)

(58) Field of Classification Search
CPC ... H02K 7/1807; H02K 7/1853; H02K 7/1861
USPC .......................... 310/50, 78; 185/39; 290/1 E
See application file for complete search history.

(56) References Cited

U.S. PATENT DOCUMENTS

| 5,975,714 | A | 11/1999 | Vetorino et al. |
| 6,563,269 | B2 | 5/2003 | Robinett et al. |
| 6,959,999 | B2 | 11/2005 | Lee |
| 7,222,984 | B2 | 5/2007 | Lee |
| 8,182,108 | B2 | 5/2012 | Pearson |
| 8,616,933 | B2 | 12/2013 | Yu et al. |
| 2006/0197477 | A1* | 9/2006 | Poon ............... H02K 7/1853 318/111 |
| 2010/0220468 | A1 | 5/2010 | Pearson |
| 2010/0264668 | A1* | 10/2010 | Hughes, Sr. ........ F03G 7/08 290/1 C |
| 2010/0276999 | A1* | 11/2010 | Gow ............... H02K 7/1853 307/64 |

* cited by examiner

*Primary Examiner* — Rexford Barnie
*Assistant Examiner* — Thai Tran
(74) *Attorney, Agent, or Firm* — Steven A. Nielsen; www.NielsenPatents.com

(57) ABSTRACT

A self-contained electro-mechanical device incorporating a hand crank wound main spring mechanism coupled with gears to a rotating magnet inside an iron core with wound copper wire for the purpose of generating electricity. An external AC adaptor can use the generator as a motor to wind the main spring without the need to use the hand crank. An internal electronic circuit is connected to the motor/generator and mechanically coupled using a unique solenoid and clutch mechanism to prevent the main spring from turning until an external load is detected. When packaged in the form of two standard C or D size batteries this invention can be installed into devices currently using electro-chemical batteries. An internal LED light enables the device to be used as a self-contained flashlight. A mini USB connector is incorporated for charging cell phones and powering numerous devices compatible with USB power.

16 Claims, 18 Drawing Sheets

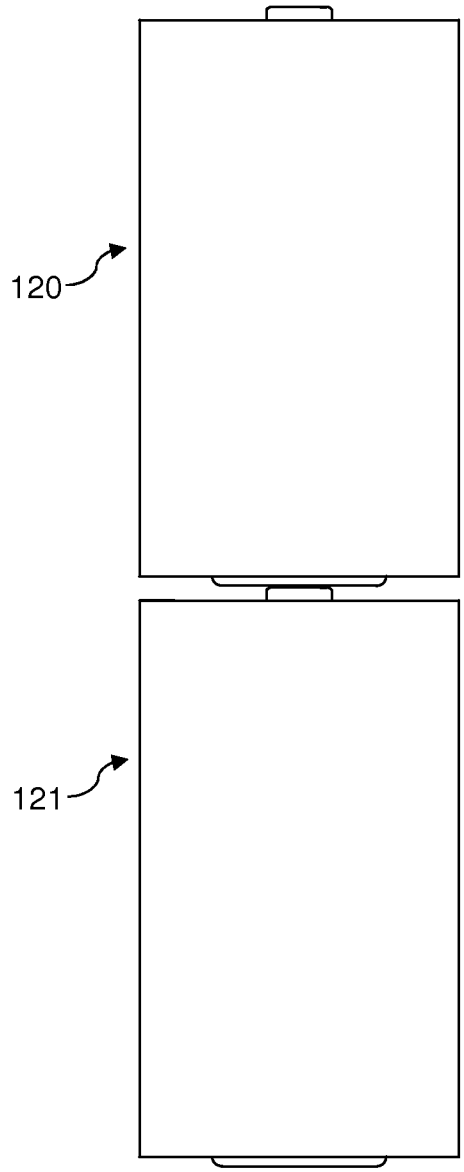
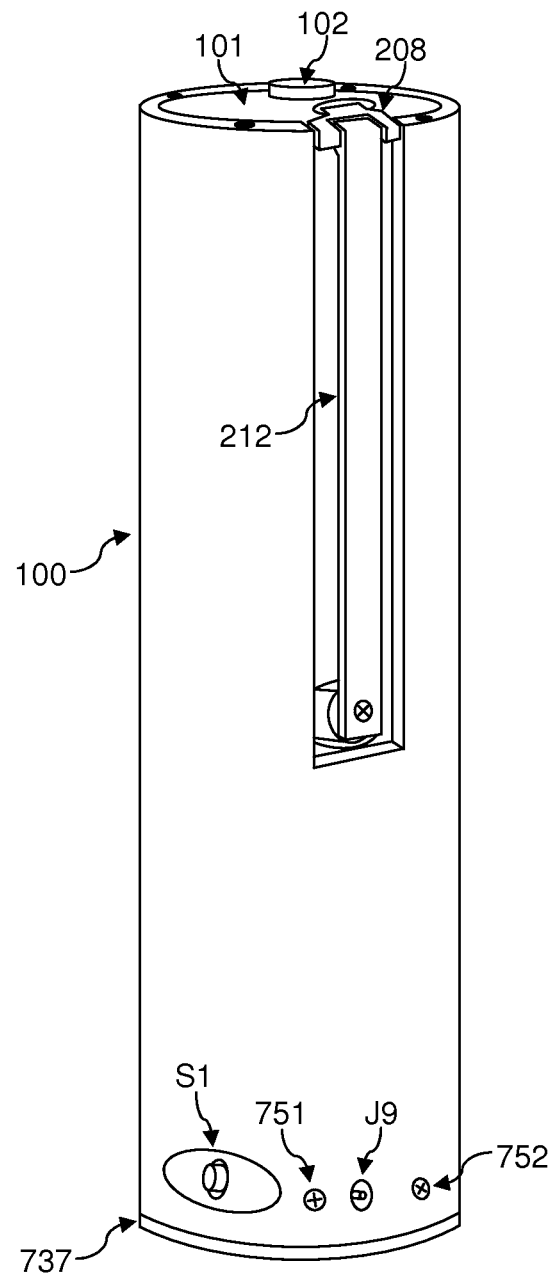
FIG. 2
FIG. 3

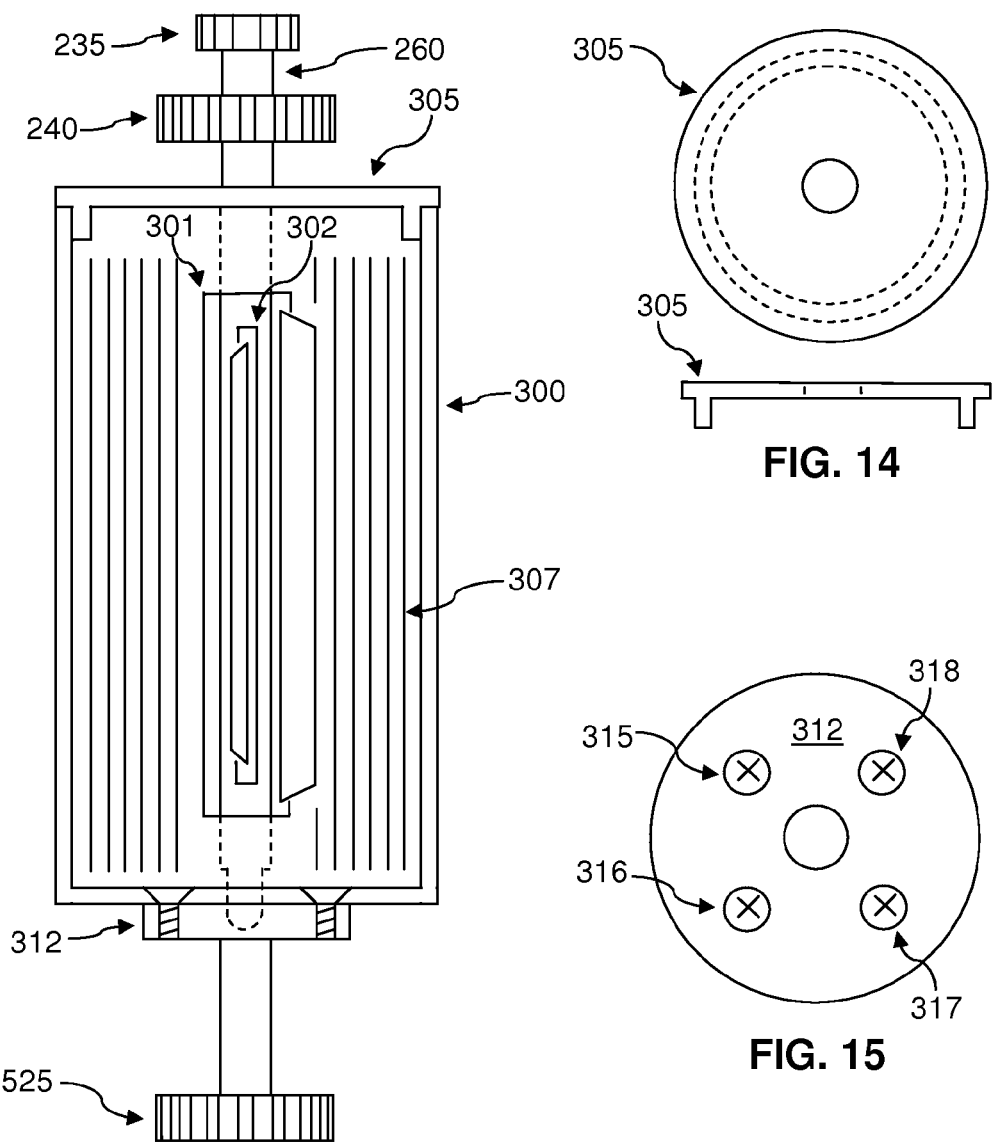
FIG. 14
FIG. 15
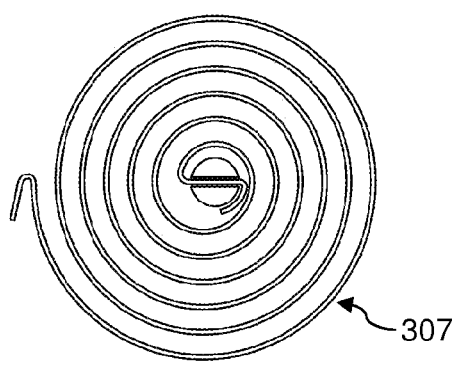
FIG. 12
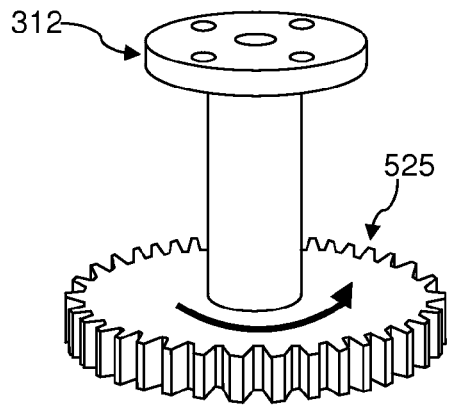
FIG. 13
FIG. 16

ELECTRO-MECHANICAL DYNAMO FOR C AND D BATTERY REPLACEMENT

BACKGROUND OF THE INVENTION (1) Field of the Invention

This invention generally relates an electro-mechanical device for the purpose of generating electricity by means of a main spring mechanism which can be wound by hand or power derived by an external AC adaptor employing a combination motor/generator. More particularly the invention provides a means to retain its potential to provide power when needed for long periods of time by implementation of a unique solenoid and clutch mechanism. Additionally this embodiment of the invention is packaged in the form of two standard C or D sized batteries stacked one on top of the other allowing the invention to be installed into devices normally using electro-chemical batteries. Additionally this invention provides a means to provide multiple voltage sources including USB power for different applications and can also be used as a self-contained LED flashlight.

(2) Description of the Related Art

There are devices that incorporate a hand crank to generate electricity. For example, U.S. Pat. Nos. 6,959,999 B2, 7,222,984, B2 to Lee et al. discloses a Hand Operated Flashlight where the generator only provides power when the hand crank is being turned charge a storage capacitor for a single external power source and charges a rechargeable battery for an internal flashlight. The present invention overcomes the deficiencies in this design by storing the energy in a mainspring that will turn a generator when a load is detected. The storage capacitor in Lee will quickly discharge by the load of the voltage regulator making the single external power source unusable without repeated turning of the hand crank. Also the rechargeable internal battery for the flashlight will weaken over repeated charge and discharge cycles as well as taking an extended period of time of continuous cranking to charge.

Another example U.S. Pat. No. 8,182,108 and Application No. U.S. 2010/0220468 to Pearson et al. discloses a Dynamo Light that uses a hand crank or dog leash to turn a generator with an undefined electric circuit and rechargeable battery. The deficiencies in this design are the same as in Lee additionally there is no disclosure for powering external devices as this is just a flashlight.

Another example U.S. Pat. No. 8,616,933 B2 to Yu et al. discloses a Dynamo Powered Toy where the hand cranked generator charges a storage capacitor or rechargeable battery. The deficiencies in this design are the same as in Lee.

Another example U.S. Pat. No. 7,497,585 B2 to Yu et al. discloses a Dynamo Powered Wearable Light where the hand cranked generator charges a storage capacitor or rechargeable battery for the purpose of lighting a LED light. The deficiencies in this design are the same as in Lee.

Another example U.S. Pat. No. 6,563,269 B2 to Robinett et al. discloses a Rechargeable Portable Light With Multiple Charging Sources where a hand cranked generator, solar panel or AC adaptor charges a storage capacitor and rechargeable battery for the purpose of lighting a LED light. The deficiencies in this design are the same as in Lee. The addition of a solar panel is unique to this design but will not supply continuous power for external loads.

Another example U.S. Pat. No. 5,975,714 to Veterino et al. discloses a Renewable Energy Flashlight where a permanent magnet is shaken within a coil for generating electricity to charge a storage capacitor and light a LED light. The deficiencies in this design are a limited storage capacity and a LED light that will quickly fade when the shaking action stops.

BRIEF SUMMARY OF THE INVENTION

This invention solves the problems inherent in the prior art devices in multiple ways. There is no prior art that incorporates a mainspring to store energy for extended periods of time coupled with a unique clutch and solenoid mechanism to power a generator on demand only when an external load is detected. There is no prior art that provides packaging of an electro-mechanical power generating device with the form and dimensions of two standard C or D size flashlight batteries that can be installed into and power devices currently using electro-chemical batteries. There is no prior art that provides multiple voltage regulated power sources that are independently activated only when a load is detected from external devices to extend the time power will be available. There is no prior art that reverses the function of a generator using it as a motor for the purpose of winding a main spring to store power.

The present invention overcomes shortfalls in the prior art by providing a reliable power source for electronic devices that are presently using electro-chemical batteries which can only be used once or rechargeable batteries which progressively weaken after multiple charging cycles. Additionally current hand crank devices do not have power density or the ability to retain available power for long periods of time or have the ability to be used in devices designed for standard C and D type batteries.

The present invention will have power available for weeks or months after the device has been installed and can be repeatedly rewound without loss of performance. The following detailed description of the drawings and their functions will clearly illustrate how this unique device can benefit the environment by reducing the chemical waste created by the disposal of thousands of electro-chemical batteries.

An object of this invention is to provide a reliable power source for electronic devices that are presently using electro-chemical batteries. Advances in electronics, metallurgy, and magnetics have made it possible to obtain the power density required to power most devices such as but not limited to flashlights, radios, and USB powered devices or for charging cell phones and PDA's.

An object of this invention is to have power available for weeks or months after the device has been installed, this is achieved in three ways. The first way is by having a unique solenoid activated clutch mechanism that locks the main spring and generator when no power is applied to the solenoid conserving the charge on the storage capacitor. The second way is the incorporation of very high off state resistance FET transistors and nano-powered voltage threshold detector Integrated Circuits in the electronic circuit to further conserve the charge on the storage capacitor. The third way is the incorporation of a high microfarad value storage capacitor in the electronic circuit to extend the time period between the activation of the generator to maintain the standby voltage.

An additional object of this invention is to provide a means to release the clutch mechanism when the device is completely discharged and there is no power available to activate the bi-directional solenoid, this is achieved in two ways. The first way is the incorporation of a hole in the side of the device where when the handle of the manual winding mechanism is pulled out to wind the main spring a detent in the handle will engage a catch lever releasing the clutch to allow the generator to turn charging the storage capacitor. A nano-power over-voltage threshold detector will push the bi-directional solenoid in one direction to release this catch lever stopping the generator when fully charged to protect the electronic components. The second way is by plugging in an external AC adaptor to use the generator as a motor to wind the spring. In this case the storage capacitor will be charged by the AC adaptor thru an independent voltage regulator and the bi-directional solenoid will be pulled in the reverse direction releasing the clutch allowing the motor/generator to turn as a motor winding the main spring. A current sensor in the AC adaptor will automatically turn it off when the main spring is fully wound.

An additional object of this invention is to provide a means to supply multiple voltages only when a load is detected. This is achieved by using very high resistance off state FET transistors as a switch with nano-power voltage threshold detectors and load detecting high value resistors to independently turn on voltage regulators to either the 3 volt battery terminal or the 5 volt mini USB power connector. If the voltage regulators where always on they would drain the storage capacitor greatly reducing the time the device will remain in standby mode.

An additional object of this invention is when packaged in the form and dimensions of two standard C or D size batteries this device can be directly installed into and power devices currently using electro-chemical batteries.

An additional object of this invention is by use of voltage regulators for the outputs a constant voltage is maintained until the main spring is completely unwound, unlike electro-chemical batteries which fade over time.

An additional object of this invention is to make use of the power available to operate an internal LED light to enable the device to be used as a flashlight.

An additional object of this invention is the dimensions, scale of the functions and quantity and value of the voltage outputs are not limited to the embodiment described herein.

BRIEF DESCRIPTION OF THE DRAWINGS

FIG. 2 shows a side view of 2 standard D cell batteries.
FIG. 3 shows a side perspective view of the exterior of the full assembly.
FIG. 12 shows a side view of the main spring, main spring winding gear, winding latch gear and main spring drive gear.
FIG. 13 shows a top view of the main spring.
FIG. 14 shows a top and side view of the main spring top cap.
FIG. 15 shows a top view of the main spring drive gear shaft and screws.
FIG. 16 shows a perspective view of the main spring drive gear and shaft.

Figure 1:
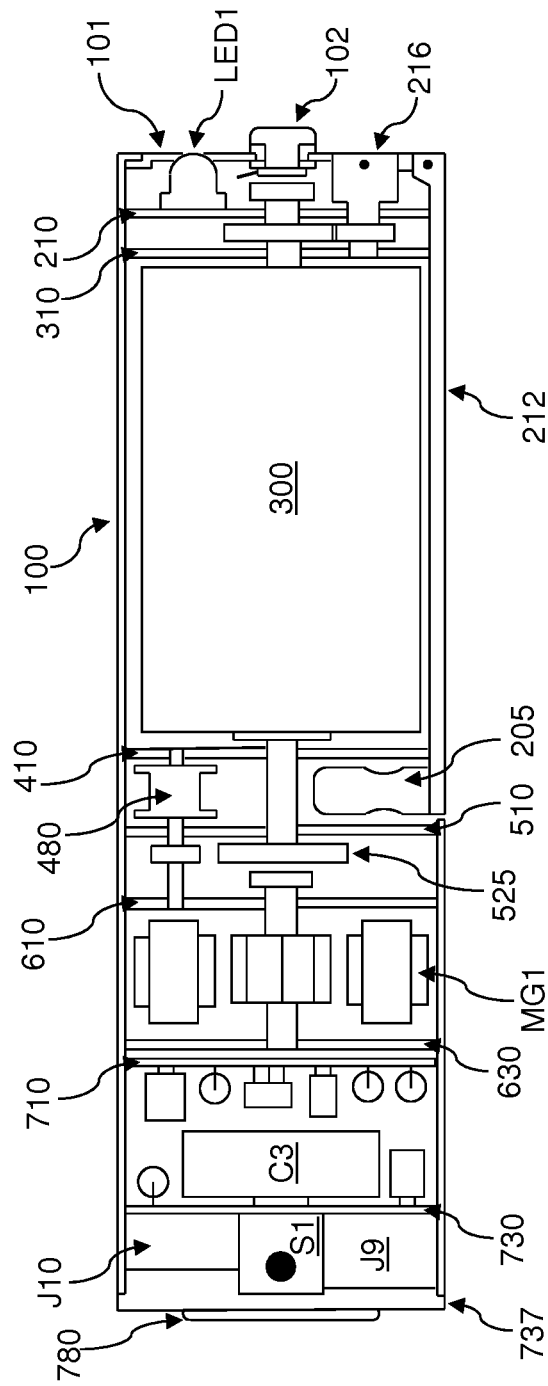
FIG. 1 shows a side cut away view of the full assembly.

REFERENCE NUMERALS IN THE DRAWINGS 100 exterior housing
101 exterior top plate
102 3 volt positive battery terminal
103 beveled plastic insulator
104 flat washer plastic insulator
105-8 4 top assembly screws
110 metal crimp lug
111 terminal screw for securing 102
120 a standard 1.5 volt D cell battery
121 a standard 1.5 volt D cell battery 205 winding handle
206 winding handle screw
208 winding handle extender
209 winding handle hinge pin
210 winding gear mounting plate
211 a hole in the winding gear mounting plate 210
212 winding handle shaft
215 winding handle gear shaft hinge pin
216 winding handle gear shaft
220-3 4 non-threaded hollow spacers
224-7 4 threaded spacers that are press fit into the 310
230 winding handle gear
235 main spring winding latch gear
240 main spring winding gear
245 winding handle shaft mounting screw
246 winding handle shaft slip washer
250 main spring winding latch
251 main spring winding latch hinge pin
252 winding latch spring
253 winding latch spring mounting post.
254 winding latch spring pin
260 main spring winding shaft
300 mainspring outer shell
301 an open slot in the mainspring outer shell 300
302 an open slot in the mainspring winding shaft 260
305 top cap for the mainspring outer shell 300
307 main spring
310 top main spring mounting plate
312 main spring drive gear shaft
315-8 4 main spring drive shaft screws
408 bi-directional solenoid
409 bi-directional solenoid electromagnetic coil
410 top clutch mounting plate
412 bi-directional solenoid permanent magnet
414 bi-directional solenoid push rod
415 bi-directional solenoid push rod pin
416 right solenoid lever arm spring post
417 right solenoid lever arm centering spring
418 solenoid lever arm spring pin
419 left solenoid lever arm centering spring
420-3 4 threaded spacers press fit into mounting plate 410
425 solenoid lever arm
427 left solenoid lever arm spring post
430 solenoid lever arm hinge pin
432 clutch roller arm hinge pin
434 clutch roller arm
436 clutch roller pin
438 clutch roller
440 handle swing arm
442 blocking post for 440
444 handle swing arm roller
445 handle swing arm roller pin
447 handle swing arm hinge pin
448 handle swing arm spring pin
450 handle swing arm spring
451 latch and swing arm spring post for springs 450 and 452
452 clutch locking latch spring
454 clutch locking latch spring pin
456 clutch locking latch
458 clutch locking latch hinge pin
463 clutch lever arm hinge pin
465 clutch lever arm spring pin
467 clutch lever arm
468 steel clutch locking band pin
470 clutch lever arm spring
472 clutch lever arm spring post
475 steel clutch locking band
477 steel clutch locking band posts
480 clutch wheel
509 a hole in the top gear chain mounting plate 510
510 top gear chain mounting plate
520-3 4 non-threaded hollow spacers
525 main spring drive gear
530 a gear
535 a gear
540 a gear
545 a gear
550 a gear
555 a gear
560 a gear
565 a gear
570 a gear
575 motor/generator drive gear
580 a gear
585 a gear
590 clutch gear
601 motor/generator drive shaft
602 laminated steel stator core for the motor/generator MG1
603-8 6 wound copper wire stator coils for the motor/generator MG1
610 motor/generator top plate
615 permanent magnet rotor for the motor/generator MG1
620-3 4 non-threaded hollow upper spacers
624-7 4 non-threaded hollow lower spacers
630 upper pc board mounting plate
710 upper pc board
720-3 4 non-threaded hollow upper spacers
724-7 4 non-threaded hollow lower spacers
730 lower pc board
737 lower plastic insert
740-3 4 long counter sunk assembly screws
745 aluminum heat sink
750-3 4 external mounting screws
780 negative battery terminal.
C1 a 1 mf capacitor
C2 a 1 mf capacitor
C3 a 1 Farad storage capacitor
C4 a 250 mf capacitor
C5 a 10 mf capacitor
C6 a 100 mf capacitor
C7 a 10 mf capacitor
C8 a 100 mf capacitor
C9 a 100 mf capacitor
C10 a 0.01 mf capacitor
C11 a 100 mf capacitor
C12 a 10 mf capacitor
C14 a 1 mf capacitor
C15 a 0.01 mf capacitor
CW1 a wire connected to 408
CW2 a wire connected to 408
D1-4 4 bridge rectifiers
D5-8 4 bridge rectifiers
D10 an isolation diode
D11 an isolation diode
D12 an isolation diode
D14 an isolation diode
D15 an isolation diode
FET1 field effect transistor
FET2 field effect transistor
FET3 field effect transistor
IC1 nano-power under-voltage detector integrated circuit
IC2 nano-power over-voltage detector integrated circuit IC3 FET voltage reversing switching matrix
IC4 nano-power under-voltage detector integrated circuit
IC5 nano-power under-voltage detector integrated circuit
J1 a connector
J2 a connector
J3 a connector
J4 a connector
J5 a connector
J6 a connector
J7 a connector
J8 a connector
J9 AC adapter power input jack
J10 mini USB power output connector
LED1 Light Emitting Diode
LW2 a wire to LED1
LW3 a wire to LED1
MG1 motor/generator
MW1 a wire connected to MG1
MW2 a wire connected to MG1
R1 a 10K resistor
R2 a 1 M resistor
R3 a 10K resistor
R4 a 10K resistor
R5 a 10K resistor
R6 a 10K resistor
R7 a 1 M resistor
R8 a 10K resistor
R9 a 10K resistor
S1 on/off switch for LED1
S2 switch contained within J9
VR1 3 Volt voltage regulator
VR2 5 Volt voltage regulator
VR3 8 Volt voltage regulator
VW3 a wire connected to crimp lug 110

DETAILED DESCRIPTION

The following detailed description is directed to certain specific embodiments of the invention. However, the invention can be embodied in a multitude of different ways as defined and covered by the claims and their equivalents. In this description, reference is made to the drawings wherein like parts are designated with like numerals throughout.

Unless otherwise noted in this specification and the claims will have the meanings normally ascribed to these terms by those skilled in the art.

Unless the context clearly requires otherwise, throughout the description and the claims, the words "comprise", "comprising" and the like are to be construed in an inclusive sense as opposed to an exclusive sense; that is to say, in a sense of "including, but not limited to". Words using the singular or plural number also include the plural or singular number, respectively. Additionally, the words "herein", "above", "below", and words of similar import, when used in this application, shall refer to this application as a whole and not to any particular portion(s) of this application.

The detailed description of embodiments of the invention is not intended to be exhaustive or limit the invention to the precise form disclosed above. While specific embodiments of, and examples for, the invention are described herein for illustrative purposes, various equivalents modifications including but not limited to the size, scale, proportions or quantity and value of the voltage outputs of the embodiment of the invention described herein are possible within the scope of the invention, as those skilled in the relevant art will recognize. For example, while steps are present in a given order, alternative embodiments may perform routines having steps in a different order. The teachings of the invention provided herein can be combined to provide further embodiments. These and other changes can be made to the invention in light of the detailed description.

Aspects of the invention can be modified, if necessary, to employ the systems, functions and concepts of the various patents and application described above to provide yet further embodiments of the invention.

These and other changes can be made to the invention in light of this detailed description.

FIG. 1 is a side cutaway view of one embodiment of the full assembly showing a basic view of the internal sub-assemblies. 100 is the exterior housing, 101 is the exterior top plate, 102 is the 3 volt positive battery terminal, LED1 is the Light Emitting Diode, 205 is the winding handle, 210 is the winding gear mounting plate, 212 is the winding handle shaft, 216 is the winding handle gear shaft, 300 is the main spring outer shell, 310 is the top main spring mounting plate, 410 is the top clutch mounting plate, 480 is the clutch wheel, 510 is the top gear chain mounting plate, 525 is the main spring drive gear, 610 is the motor/generator top plate, MG1 is the motor/generator, 630 is the upper pc board mounting plate, 710 is the upper pc board, 730 is the lower pc board, J9 is the AC adapter power input jack, S1 is the on/off switch for the Light Emitting Diode, J10 is the mini USB power output connector, 737 is the lower plastic insert and 780 is the negative battery terminal. A detailed description of the functions of the sub-assemblies will follow.

FIG. 2 is a side view of 2 standard 1.5 volt D cell batteries 120 and 121 stacked one on top of the other with a 3 volt combined normal output voltage representing the exterior dimensions of one embodiment of the invention.

FIG. 3 is a side perspective exterior view of one embodiment the invention with the exterior dimensions of FIG. 2 where 100 is the exterior housing, 101 is the exterior top plate, 102 is the 3 volt positive battery terminal, 208 is the winding handle extender, 212 is the winding handle shaft, S1 is the on/off switch for the LED light, J9 is the AC adapter power input jack, 751 and 752 are 2 of the 4 side assembly screws for the lower plastic insert 737.

Figure 4:
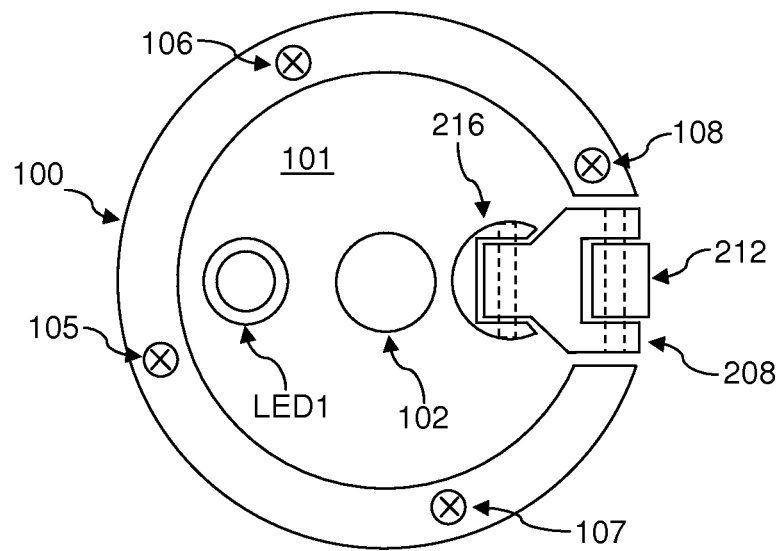
FIG. 4 shows a top view of the exterior of the assembly.

FIG. 4 is a top view of one embodiment of the invention where 100 is the exterior housing, 101 is the exterior top plate, 102 is the 3 volt positive battery terminal, LED1 is the Light Emitting Diode, 208 is the winding handle extender, 212 is the winding handle shaft, 216 is the winding handle gear shaft, 105-108 are the 4 top assembly screws.

Figure 5:
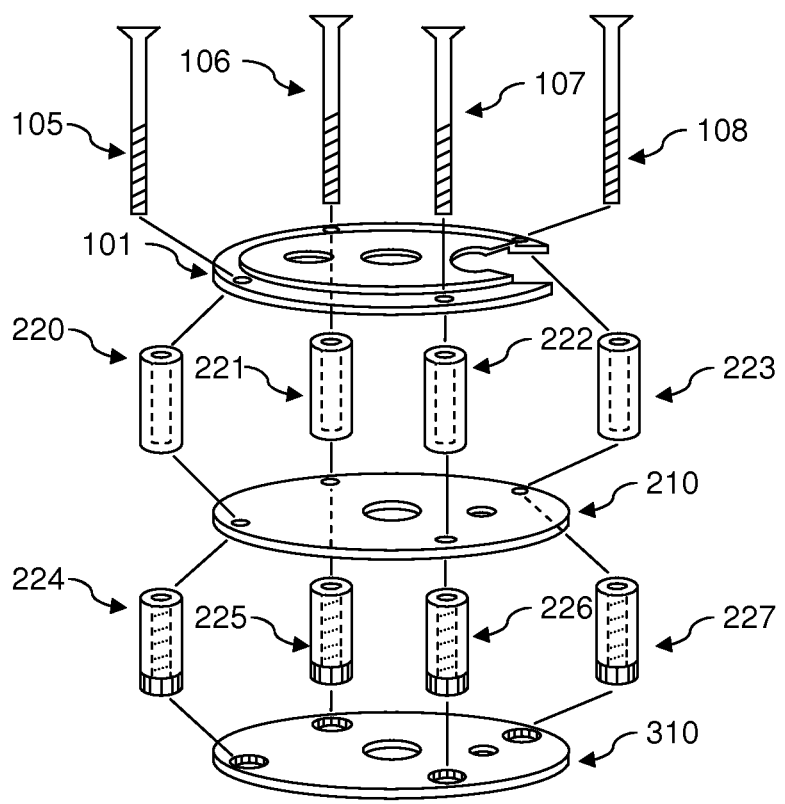
FIG. 5 shows an exploded perspective view of the top assembly screws, exterior top plate, winding gear mounting plate, top main spring mounting plate, and standoffs.

FIG. 5 is a side perspective view of the top assembly plates, screws, and spacers where 105-108 are the 4 top assembly screws, 101 is the exterior top plate, 210 is the winding gear mounting plate, 310 is the top main spring mounting plate, 220-223 are 4 non-threaded hollow spacers, 224-227 are 4 threaded spacers that are press fit into 310.

Figure 6:
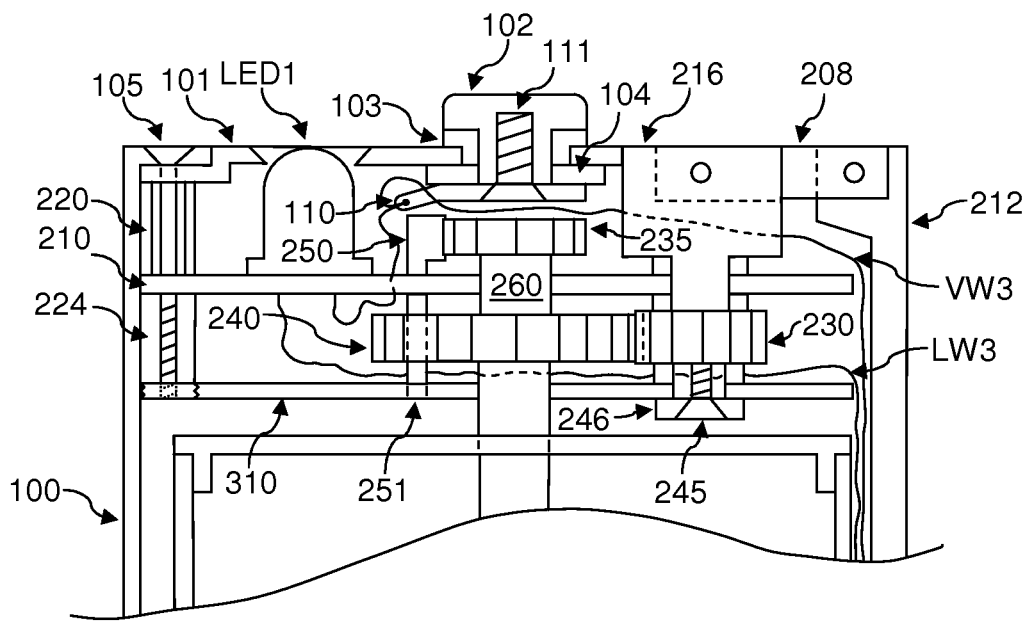
FIG. 6 shows a side cutaway view of the top main spring winding assembly with the LED light and 3 volt positive battery terminal.
Figure 31:
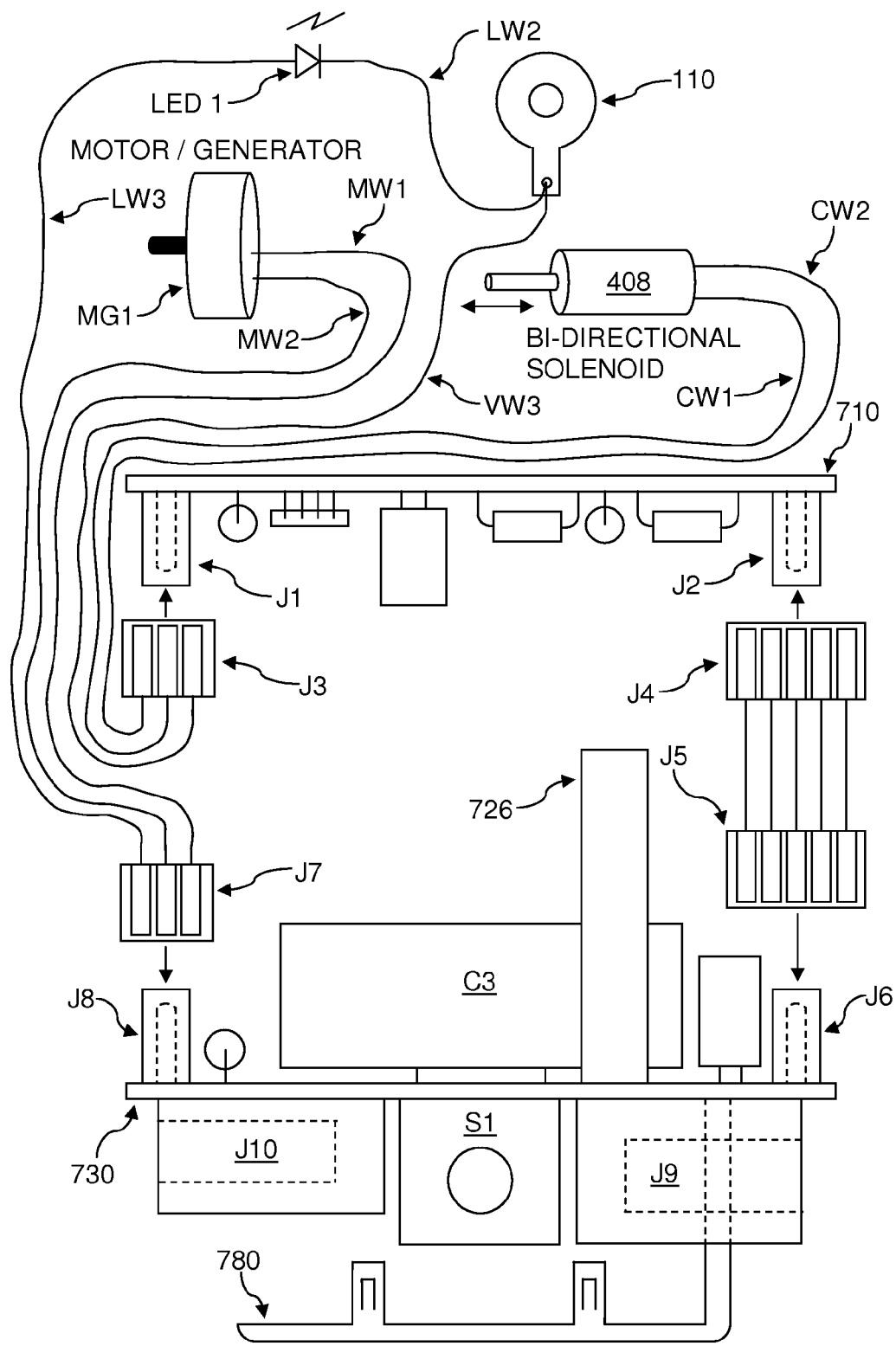
FIG. 31 shows a side view of the upper pc board, lower pc board, motor/generator, bi-directional solenoid, LED, 3 volt crimp lug, negative battery terminal and internal wiring.

FIG. 6 is a side cutaway view of one embodiment of the invention where 100 is the exterior housing, 101 is the exterior top plate, 102 is the 3 volt positive battery terminal, LED1 is the Light Emitting Diode, 103 is a beveled plastic insulator isolating 102 from the exterior housing, 104 is a flat washer plastic insulator, 105 is one of the 4 top assembly screws, 110 is a metal crimp lug for connecting power to 102 held in place with terminal screw 111, 208 is the winding handle extender, 210 is the winding gear mounting plate, 216 is the winding handle gear shaft, 220 is one of 4 non-threaded hollow spacers, 224 is one of 4 threaded spacers that are press fit into 310, 230 is the winding handle gear, 235 is the main spring winding latch gear, 240 is the main spring winding gear, 245 is the winding handle shaft mounting screw with the winding handle slip washer 246, 250 is the main spring winding latch, 251 is the main spring winding latch hinge pin and 260 is the main spring winding shaft, VW3 is the 3 volt power wire connected to the upper pc board via J3 as shown in FIG. 31 and LW3 is the LED switch wire connected to the lower pc board via J7 as shown in FIG. 31.

Figure 7:
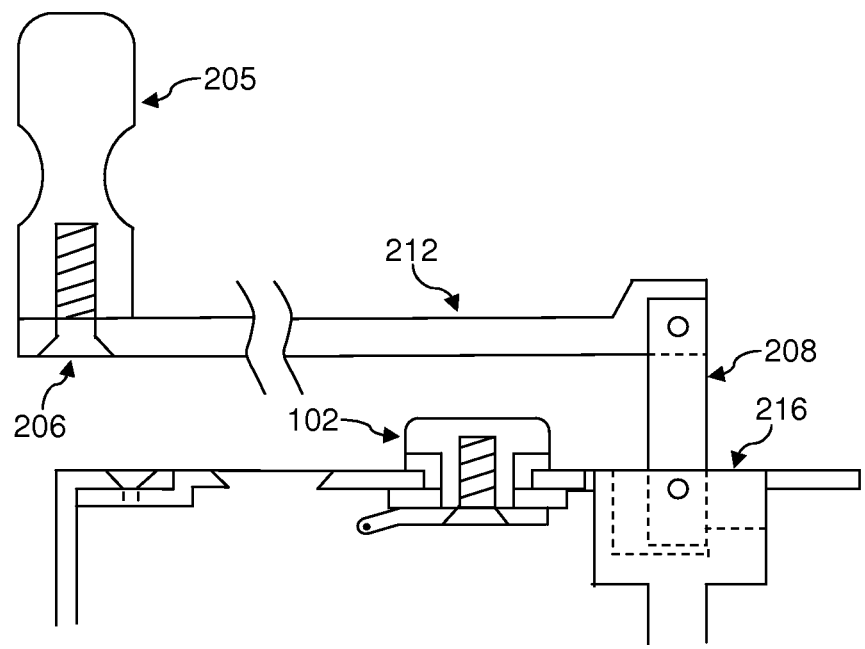
FIG. 7 shows a side view of the top main spring winding assembly with the spring winding handle open into the winding position.

FIG. 7 is a side view of one embodiment of the invention where the winding handle 205 secured with winding handle screw 206 is extended into the spring winding position along with 208 and 216. The winding direction is clockwise when viewed from the top as shown by the arrows in FIG. 8. Additionally 216 is machined to stop 208 from over-rotating potentially touching 102 as shown by the dotted lines.

Figure 8:
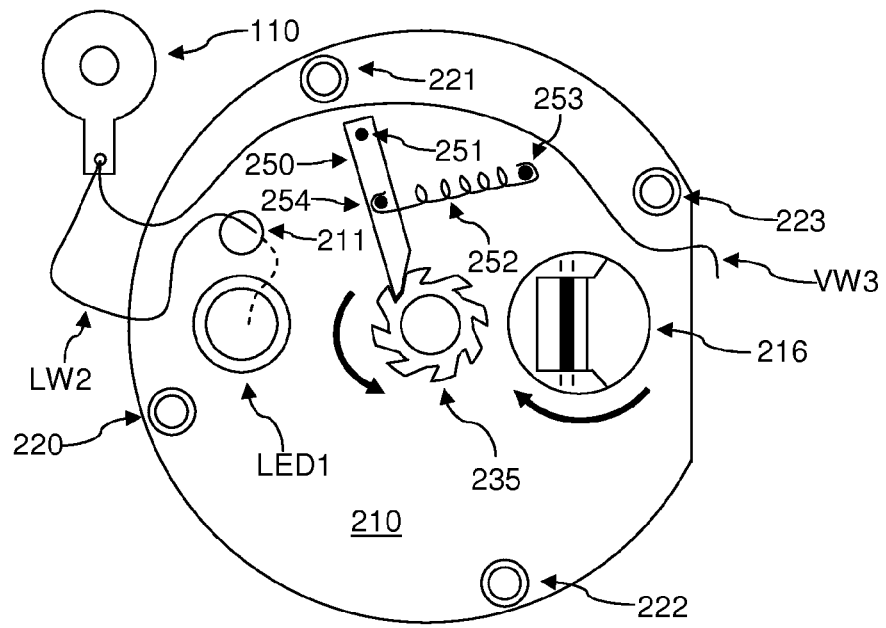
FIG. 8 shows a top view of the winding gear mounting plate containing the main spring winding latch, LED, 3 volt crimp lug, and top of winding handle gear.
Figure 10:
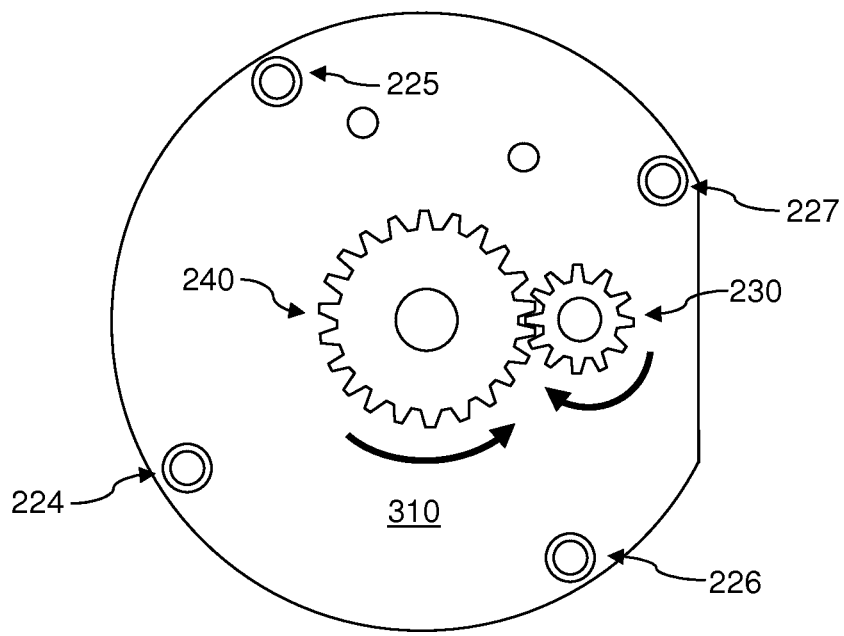
FIG. 10 shows a top view of the top main spring mounting plate winding handle gear and main spring winding gear.

FIG. 8 is a top view of one embodiment of the invention where wire LW2 passes thru a hole in the winding gear mounting plate 211 from LED1 and wire VW3 are connected to metal crimp lug 110. The winding gear mounting plate 210 is shown with the 4 non-threaded hollow spacers 220-223. The direction of rotation for 216 and 235 are shown, the gears that link these 2 parts is shown in FIG. 10. The main spring winding latch gear 235 prevents the main spring from unwinding with the main spring winding latch 250 with the winding latch spring 252 and the winding latch spring pin 254, 251 is the main spring winding latch hinge pin and 253 is the winding latch spring mounting post.

Figure 9:
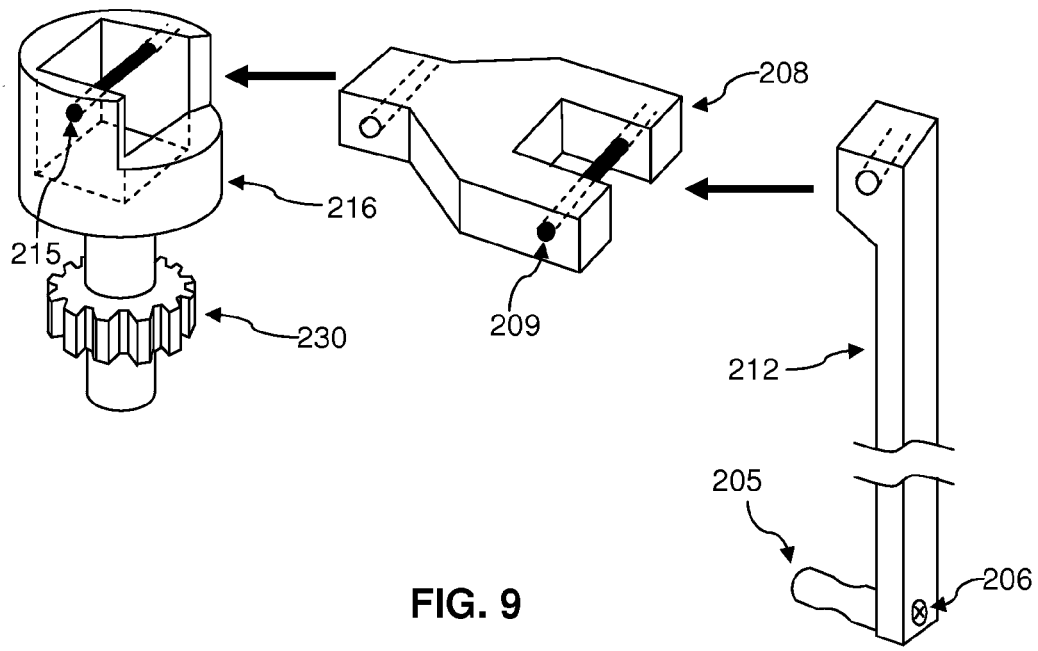
FIG. 9 shows a perspective view of the winding handle gear, winding handle extender, and winding handle.

FIG. 9 is an exploded view of one embodiment of the invention where the components that comprise the winding handle mechanism are shown. The winding handle 205 secured to the winding handle shaft 212 with winding handle screw 206 and attached to the winding handle extender 208 with winding handle hinge pin 209. 208 is attached to 216 with the winding handle gear shaft hinge pin 215 turning winding handle gear 230.

FIG. 10 is a top view of one embodiment of the invention where the 4 threaded spacers 224-227 are press fit into the top main spring mounting plate 310. The interface between gears 230 and 240 is shown.

Figure 11:
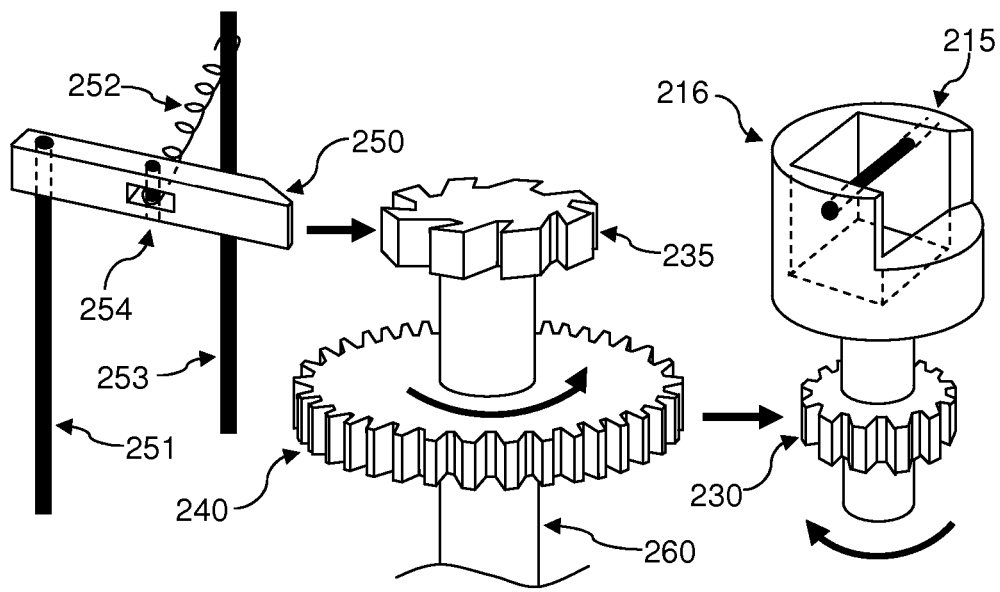
FIG. 11 shows a perspective view of the spring winding latch, main spring winding gear and winding handle gear.

FIG. 11 is an exploded view of one embodiment of the invention where the components that comprise the winding handle gear shaft 216, gears 230 and 240, and a detail of how the winding latch spring 252 is attached to the main spring winding latch 250 with winding latch spring pin 254 is shown.

FIG. 12 is a side view of one embodiment of the invention where the main spring assembly is shown. Gears 235 and 240 are attached to the mainspring winding shaft 260. There is an open slot 302 in the main spring winding shaft 260 for securing the inside core of the main spring 307. 300 is the main spring outer shell for containing the main spring with an open slot in the main spring outer shell 301 for securing the outer end of the main spring 307. 305 is the top cap for the main spring outer shell 300, 260 rotates freely thru the opening in 305 and the end of 260 sits in a bearing at the top of main spring drive gear shaft 312. The main spring outer shell 300, top cap 305, main spring drive gear shaft 312, and main spring drive gear 525 all rotate together as the main spring unwinds driving the motor/generator thru a gear chain shown in FIG. 26 and rotate independently from the winding assembly.

FIG. 13 is a top view of one embodiment of the invention showing the main spring 307.

FIG. 14 is a top and side view of one embodiment of the invention showing the top cap 305 for the main spring outer shell 300.

FIG. 15 is a top view of one embodiment of the invention showing the top of main spring drive gear shaft 312 and the 4 mounting screws 315-318 for attachment to the main spring outer shell 300.

FIG. 16 is a perspective view of one embodiment of the invention showing the main spring drive gear shaft 312 and main spring drive gear 525.

Figure 17:
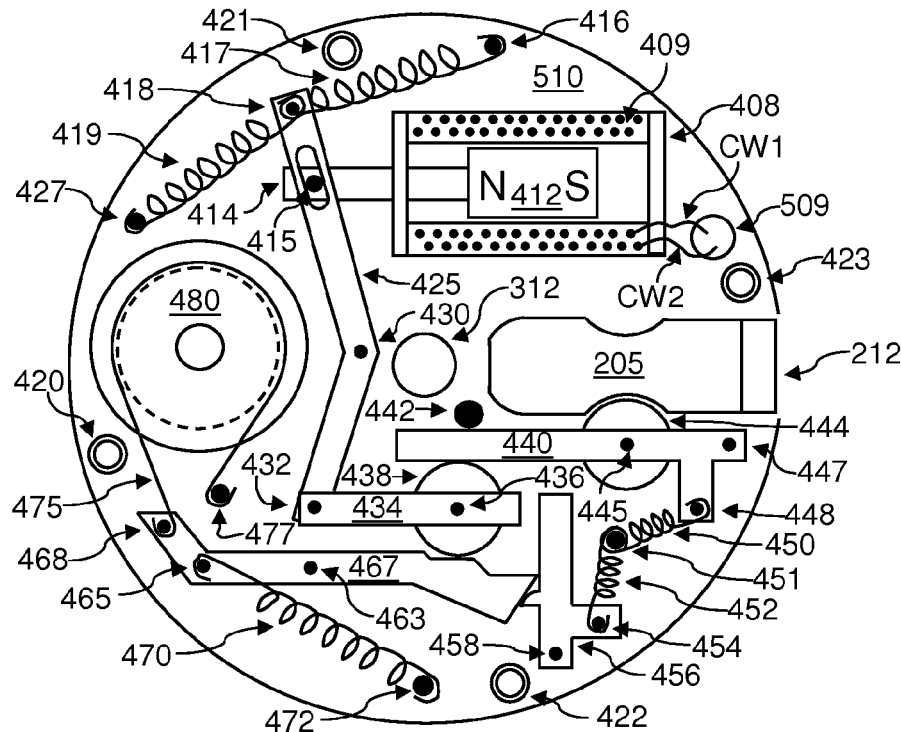
FIG. 17 shows a top view of the bi-directional solenoid, clutch, winding handle, latching and clutch mechanism in the discharged or fully charged standby in the clutch locked state.
Figure 34:
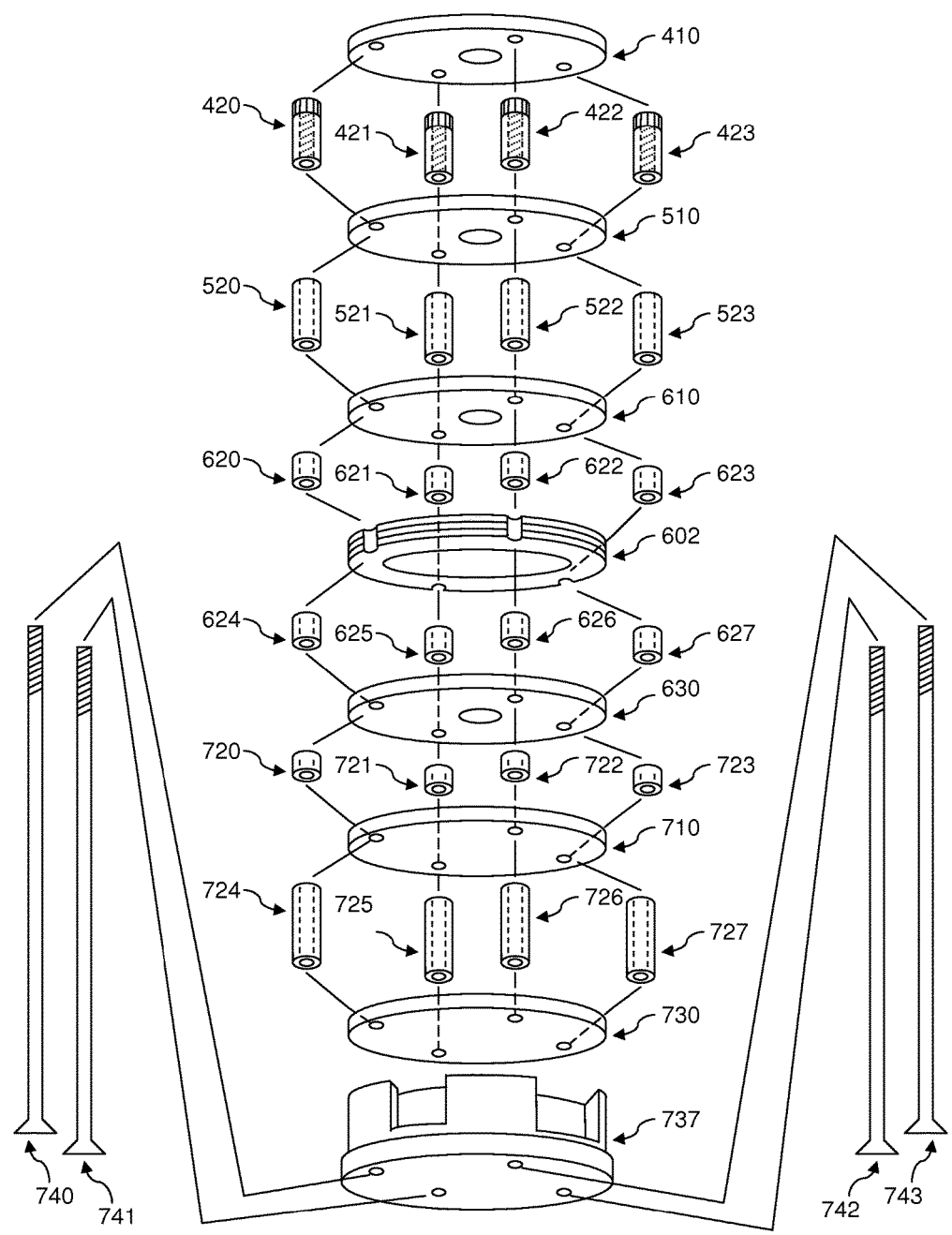
FIG. 34 shows a perspective view of the lower plastic insert, bottom assembly screws, lower mounting plates, laminated steel stator core, and standoffs.

FIG. 17 is a top view of one embodiment of the invention showing the clutch release mechanism in the clutch locked, discharged or fully charged standby state where the winding handle 205 is fully inserted into the side of the assembly with the winding handle shaft 212. The 4 threaded spacers 420-423 are shown on top of the top gear chain mounting plate 510, these are press fit into the top clutch mounting plate 410 as shown in FIG. 34. 408 is a cut away view of the bi-directional solenoid showing the bi-directional solenoid electromagnetic coil 409, coil wirers CW1 and CW2 passing thru a hole 509 in the top gear chain mounting plate 510 which are connected to the upper pc board via J3 shown in FIG. 31, internal bi-directional solenoid permanent magnet 412, bi-directional solenoid push rod 414, and bi-directional solenoid push rod pin 415. In this state there is no power applied to the bi-directional solenoid, it is held in the centered position with the right solenoid lever arm centering spring 417 secured with the right solenoid lever arm centering spring post 416 and the left solenoid lever arm centering spring 419 secured with the left solenoid lever arm centering spring post 427 attached to the solenoid lever arm 425 with solenoid lever arm spring pin 418. The solenoid lever arm 425 rotates around solenoid lever arm hinge pin 430 and is hinged to the clutch roller arm 434 with clutch roller arm hinge pin 432. The clutch roller 438 is secured to 434 with clutch roller pin 436. Handle swing arm 440 with handle swing arm roller 444 secured with handle swing arm roller pin 445 is secured with handle swing arm hinge pin 447 and kept in place with handle swing arm spring 450 attached to 440 with handle swing arm spring pin 448 and secured with latch and swing arm spring post 451. Blocking post 442 prevents 440 from rubbing against the main spring drive gear shaft 312 when the winding handle 205 is removed. Clutch lever arm 467 rotates around clutch lever arm hinge pin 463 and locks the clutch wheel 480 with clutch lever arm spring 470 attached to 467 with clutch lever arm spring pin 465 and held in place with clutch lever arm spring post 472 and steel clutch locking band 475 attached to 467 with steel clutch locking band pin 468 and held in place at the other end with steel clutch locking band post 477. In this view the clutch wheel 480 is locked preventing the main spring 307 from turning the motor/generator MG1. The clutch locking latch 456 which rotates around clutch locking latch hinge pin 458 and is pulled with clutch locking latch spring 452 attached to 456 with clutch locking latch spring pin 454 and secured with latch and swing arm spring post 451 is not latching 467 in this view of the clutch assembly.

Figure 18:
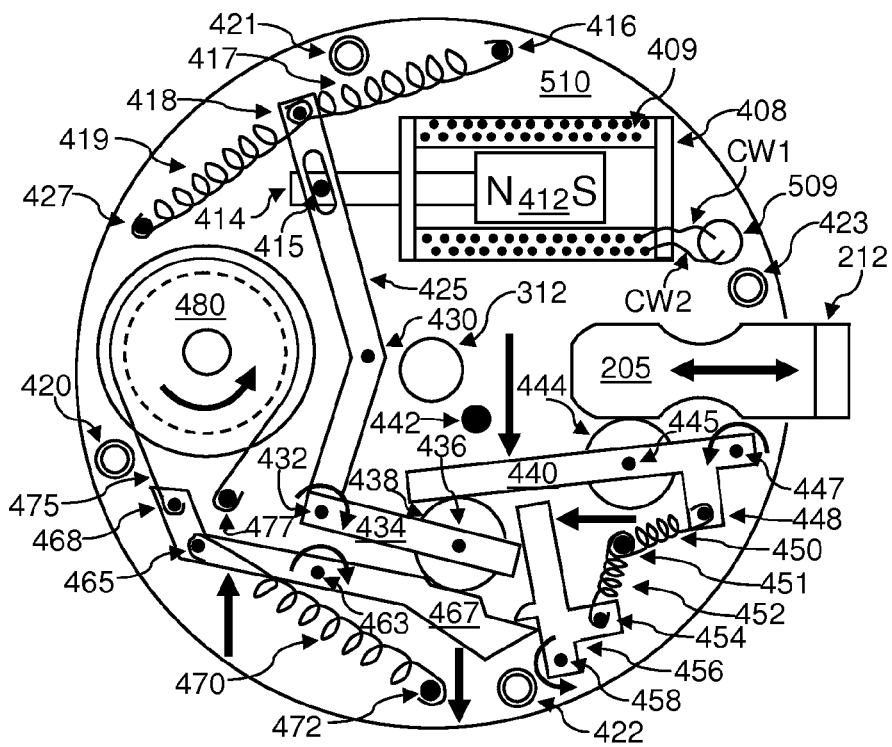
FIG. 18 shows a top view of the bi-directional solenoid, clutch, winding handle partially removed, latching and clutch mechanism in the clutch un-locked and latched ready for winding state.

FIG. 18 is a top view of one embodiment of the invention showing the clutch release mechanism in the clutch unlocked, discharged or charging state where the winding handle 205 is either being inserted or removed from the side of the assembly. During this action as the detent in the center of the handle moves, the end of the handle will push on the handle swing arm roller 444 causing the handle swing arm 440 to push on the clutch roller 438 and push the clutch lever arm 467 far enough to allow the clutch locking latch 456 to lock the clutch lever arm 467 releasing the tension on the steel clutch locking band 475 allowing the clutch wheel 480 and motor/generator MG1 shown in FIG. 27 to rotate charging the 1 Farad storage capacitor C3 shown in FIG. 35.

Figure 19:
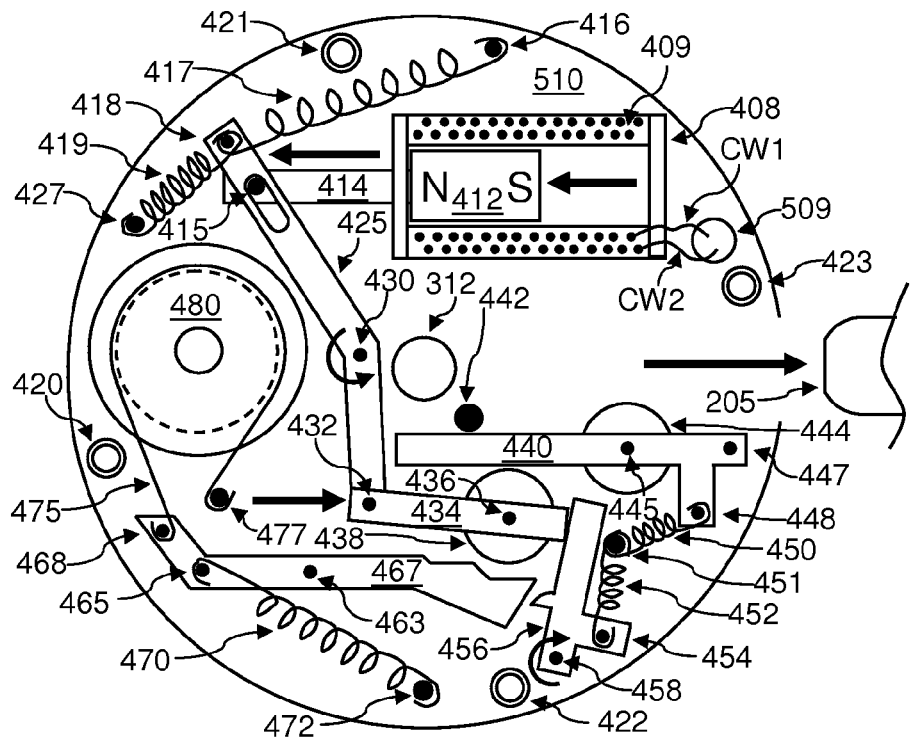
FIG. 19 shows a top view of the bi-directional solenoid, clutch, winding handle completely removed, latching and clutch mechanism in the over-voltage bi-directional solenoid pushed to release the latch in the clutch locked state.
Figure 20:
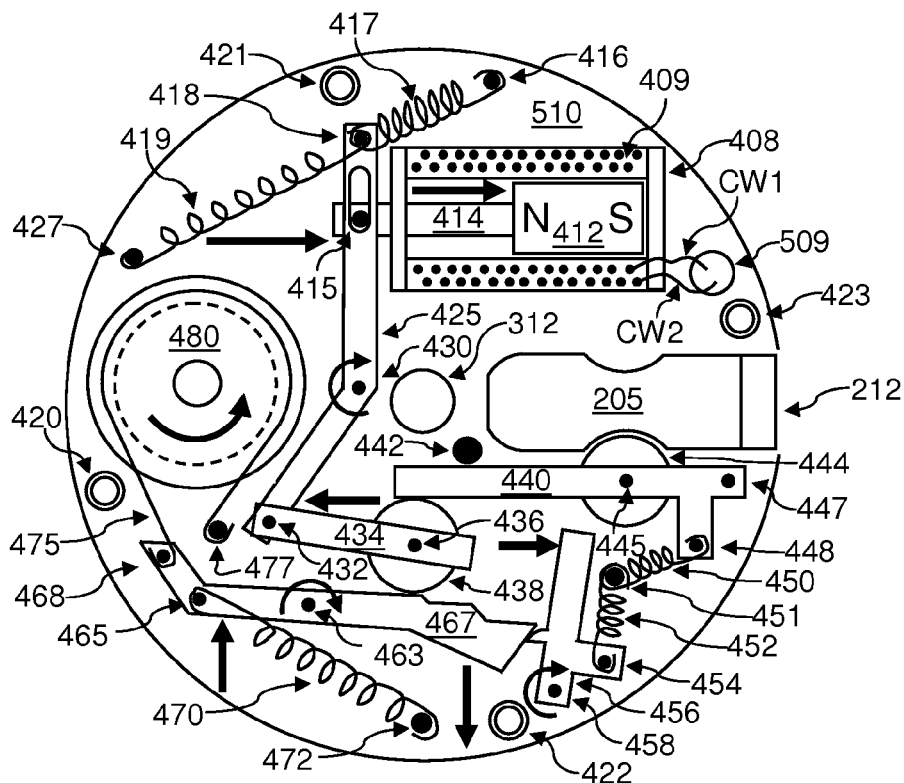
FIG. 20 shows a top view of the bi-directional solenoid, clutch, winding handle, latching and clutch mechanism in the under-voltage bi-directional solenoid pulled in the clutch un-locked to charge the storage capacitor state.

In the action where the winding handle 205 is being removed for winding the main spring 307 the clutch locking latch 456 will remain in the clutch un-locked position until over-voltage is detected and then released by the bi-directional solenoid 408 as shown in FIG. 19. During the charging cycle in this mode, under-voltage will be briefly detected activating the bi-directional solenoid 408 in the opposite direction as seen in FIG. 20 however this will not disengage the clutch locking latch 456.

In the action where the winding handle 205 is being inserted after the device is fully charged the clutch locking latch 456 will be briefly engaged and then released by over-voltage detection by the bi-directional solenoid 408 as shown in FIG. 19.

There is a potential faulty user action that has been taken into consideration in the design of this mechanism where the winding handle 205 is partially inserted as shown in this FIG. 18 after the device has been fully charged. In this case when over-voltage is detected the bi-directional solenoid 408 will push the clutch roller 438 into the extra space provided by the deeper step in the clutch lever arm 467 locking the clutch wheel 480. However if left in this position when under-voltage is detected the bi-directional solenoid 408 will pull the clutch roller 438 into a position where the clutch locking latch 456 will be re-engaged repeating the cycle. This will not damage the mechanism but will slowly unwind the main spring 307.

FIG. 19 is a top view of one embodiment of the invention showing the clutch release mechanism in the clutch locked, over-voltage detected state where the winding handle 205 is fully removed from the side of the assembly when winding the main spring 307. In this mode the bi-directional solenoid 408 is in the pushed position having a voltage applied to the bi-directional solenoid electromagnetic coil 409, by having a positive voltage applied to coil wire CW1 and a ground potential applied to CW2 which are connected to the upper pc board via J3 shown in FIG. 31, the internal bi-directional solenoid permanent magnet 412, pushes the bi-directional solenoid push rod 414 and bi-directional solenoid push rod pin 415 out. In this state the right solenoid lever arm centering spring 417 is stretched and left solenoid lever arm centering spring 419 is compressed. Bi-directional solenoid push rod pin 415 rotates the solenoid lever arm 425 around solenoid lever arm hinge pin 430 pushing the clutch roller arm 434 into the clutch locking latch 456 releasing the clutch lever arm 467 locking the clutch wheel 480 and stopping it from rotating.

FIG. 20 is a top view of one embodiment of the invention showing the clutch release mechanism in the clutch un-locked, under-voltage detected state where the winding handle 205 is fully inserted into the side of the assembly. In this mode the bi-directional solenoid 408 is in the pulled position having a voltage applied to the bi-directional solenoid electromagnetic coil 409, by having a ground potential applied to coil wire CW1 and a positive voltage applied to CW2 which are connected to the upper pc board via J3 shown in FIG. 31, the internal bi-directional solenoid permanent magnet 412, pulls the bi-directional solenoid push rod 414 and the bi-directional solenoid push rod pin 415 in. In this state the right solenoid lever arm centering spring 417 is compressed and left solenoid lever arm centering spring 419 is stretched. Bi-directional solenoid push rod pin 415 rotates the solenoid lever arm 425 around solenoid lever arm hinge pin 430 pulling the clutch roller arm 434 into a narrower gap between the handle swing arm 440 and the clutch lever arm 467 un-locking the clutch wheel 480 allowing it to rotate along with motor/generator MG1 shown in FIG. 27 charging the 1 Farad capacitor C3 shown in FIG. 35. In this mode the rotation of the clutch lever arm 467 is sufficient to release the clutch but not enough to engage the clutch locking latch 456. This is the normal operating mode when this device is being used to power any external device or when briefly activated to maintain the standby voltage.

Figure 21:
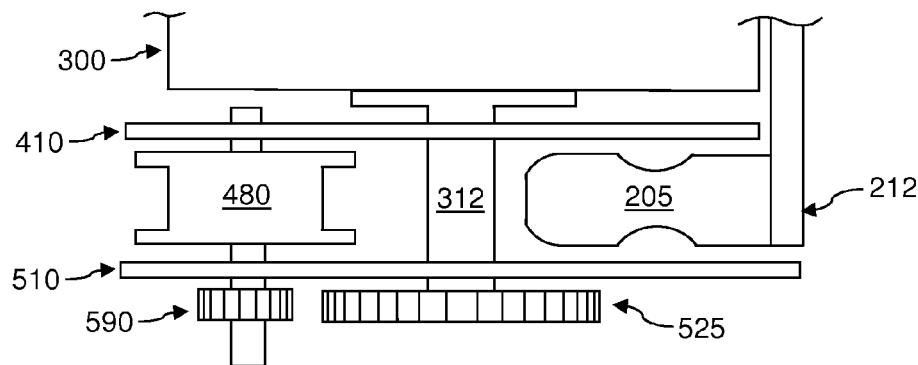
FIG. 21 shows a side view of the clutch wheel, clutch gear, winding handle and main spring drive gear.

FIG. 21 is a side view of one embodiment of the invention showing the relationship of some of the components comprising the clutch assembly where 300 is the bottom of the main spring outer shell, 312 is the main spring drive gear shaft, 525 is the main spring drive gear, 410 is the top clutch mounting plate, 510 is the top gear chain mounting plate, 205 is the winding handle, 212 is the winding handle shaft, 480 is the clutch wheel, and 590 is the clutch gear.

Figures 22, 23:
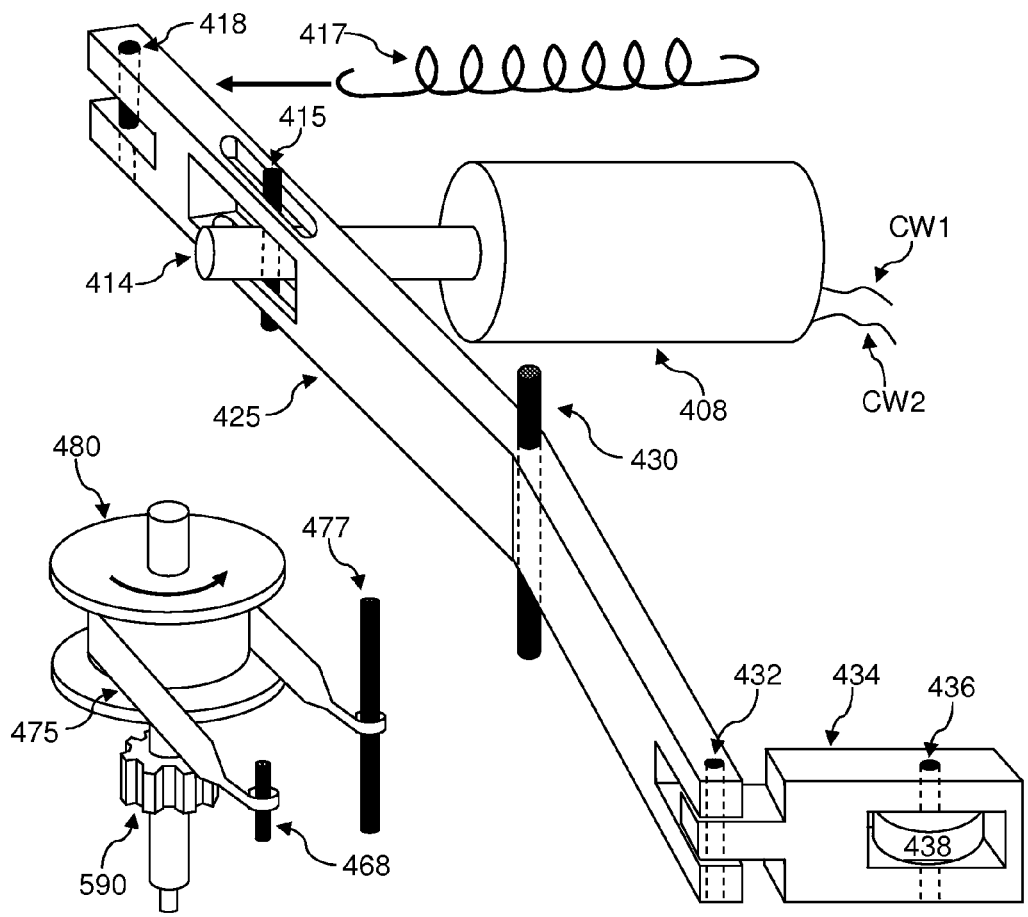
FIG. 22 shows a perspective view of the bi-directional solenoid, one of two solenoid centering springs, solenoid lever arm with hinge pin and clutch roller.
FIG. 23 shows a perspective view of the clutch wheel, clutch locking band and mounting pins.

FIG. 22 is a detailed perspective view of one embodiment of the invention showing the exterior of the bi-directional solenoid 408, coil wirers CW1 and CW2, bi-directional solenoid push rod 414 and bi-directional solenoid push rod pin 415, one of the 2 solenoid lever arm centering springs 417 attached with solenoid lever arm spring pin 418, the solenoid lever arm 425 which rotates around solenoid lever arm hinge pin 430 and is hinged to the clutch roller arm 434 with clutch roller arm hinge pin 432, the clutch roller 438 secured to 434 with clutch roller pin 436. This FIG. 22 is sufficient to detail the form of the other similar springs, arms, pins, roller, and hinges in this assembly.

FIG. 23 is a detailed perspective view of one embodiment of the invention showing the clutch wheel 480, the clutch gear 590, the steel clutch locking band 475 attached to the steel clutch locking band pin 468 and steel clutch locking band post 477. The function of how this clutch works has been previously described.

Figure 24:
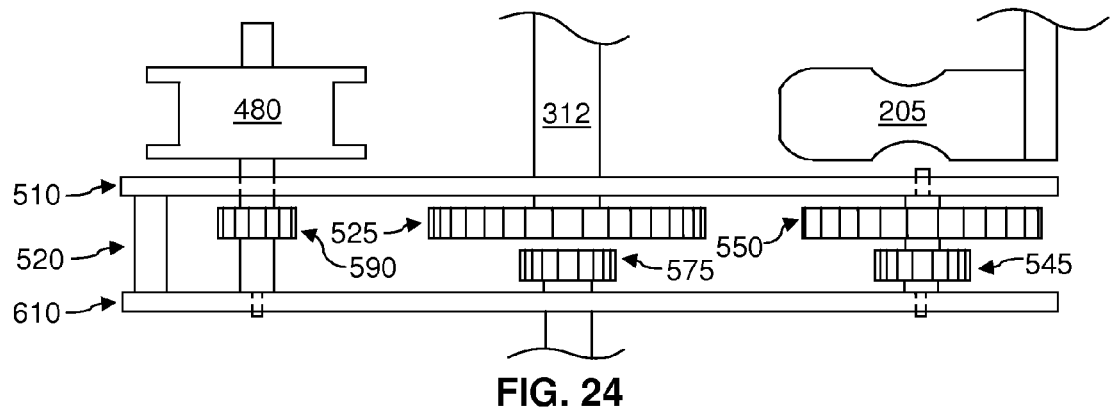
FIG. 24 shows a side view of the clutch wheel, clutch gear, main spring drive gear, winding handle, motor/generator drive gear, and two of the gear ratio increasing gears.

FIG. 24 is a side view of one embodiment of the invention showing the relationship of some of the components comprising the gear assembly where 312 is the main spring drive gear shaft, 525 is the main spring drive gear, 510 is the top gear chain mounting plate, 205 is the winding handle, 520 is one of 4 non-threaded hollow spacers detailed in FIG. 34, 480 is the clutch wheel, 590 is the clutch gear, 610 is the motor/generator top plate, 575 is the motor/generator drive gear, and two of the gear chain gears 545 and 550 which rotate together on a common shaft. This view also shows the gear assembly is limited to two gear high spacing and gears 525 and 575 which are positioned one on top of the other as shown in FIG. 25 are not directly linked to each other and turn in opposite directions as shown in FIG. 26.

Figure 25:
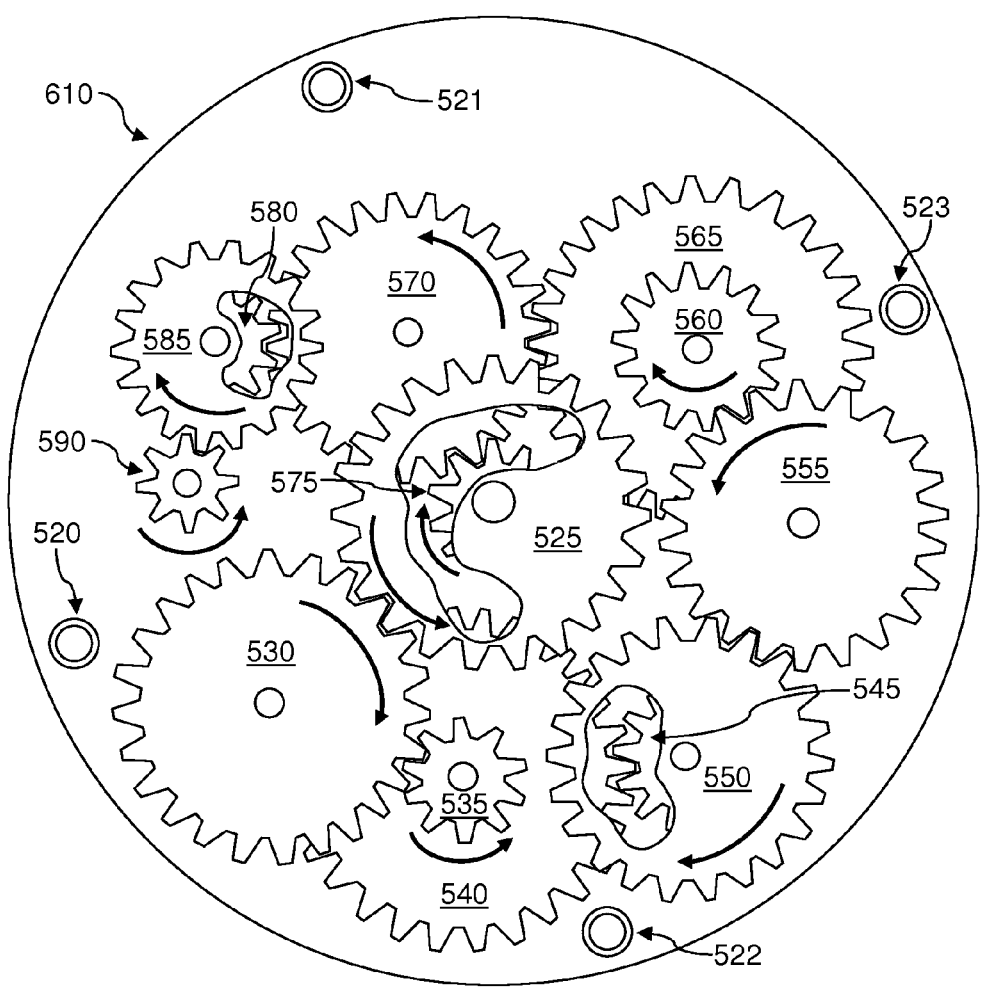
FIG. 25 shows a top view of the gear assembly.
Figure 26:
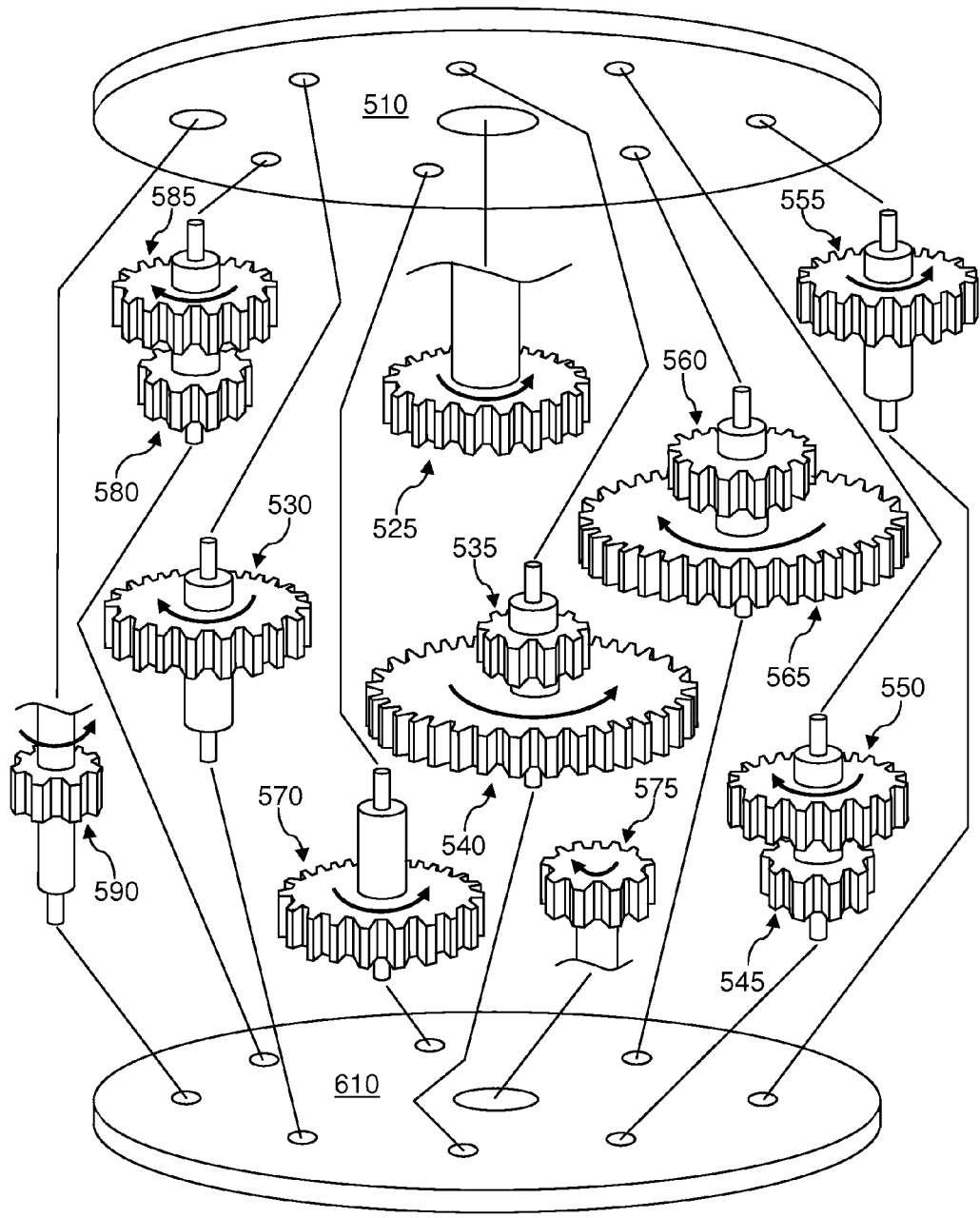
FIG. 26 shows a perspective exploded view of the gear assembly.

FIG. 25 is a top view of one embodiment of the invention showing the entire gear assembly with cutaway views revealing the gears that are positioned under other gears. With the exception of gears 525 and 575 all gears stacked one on top of the other turn together on a common shaft. The main spring drive gear 525 turns gear 530 which turns gear 535 and 540 which turns 545 and 550 which turns gear 555 which turns gear 560 and 565 which turns gear 570. Gear 570 turns both the motor/generator drive gear 575 and gear 580 and 585 which turns the clutch gear 590. The direction of rotation arrows shown in this FIG. 25 are for the normal operating mode where the motor/generator MG1 is acting as a generator. When the AC adapter is plugged in to rewind the main spring without using the winding handle 205 the motor/generator MG1 will act as a motor and the direction of all of the gears is reversed. The following table shows the gear ratios for this assembly:

| First Chain of Gears | Second Chain of Gears |
| --- | --- |
| 525 to 530 = 1 to 1 | 570 to 580 = 1 to 2.4 |
| 530 to 535 = 1 to 2.6 | 580 to 585 = 1 to 1 |
| 535 to 540 = 1 to 1 | 585 to 590 = 1 to 2.2 |
| 540 to 545 = 1 to 2.8 | |
| 545 to 550 = 1 to 1 | |
| 550 to 555 = 1 to 1 | |
| 555 to 560 = 1 to 1.6 | |
| 560 to 565 = 1 to 1 | |
| 565 to 570 = 1 to 1.4 | |
| 570 to 575 = 1 to 2.4 | |

This table results in a gear ratio of 1 to 39.13728 between the main spring drive gear 525 and the motor/generator drive gear 575, comprising the first chain of gears, meaning for each single turn of the main spring the motor/generator will turn about 40 times. This also results in a gear ratio of 1 to 86.102 between the main spring drive gear 525 and the clutch gear 590, where gears 570, 580, 585 and 590 comprise the second chain of gears. This high gear ratio creates a state where it only takes a small amount of force applied by the steel clutch band 475 to keep the main spring from turning. It should be noted that these gear ratios are for one embodiment of the invention and may be changed to optimize performance.

FIG. 26 is an exploded view of one embodiment of the invention showing the entire gear assembly showing the top gear chain mounting plate 510 and motor/generator top plate 610 and where the main spring drive gear 525 turns gear 530 which turns gear 535 and 540 which turns gear 545 and 550 which turns gear 555 which turns gear 560 and 565 which turns gear 570. Gear 570 turns both the motor/generator drive gear 575 and gear 580 and 585 which turns the clutch gear 590. The direction of rotation arrows shown in this FIG. 26 are for the normal operating mode where the motor/generator MG1 is acting as a generator. When the AC adapter is plugged in to rewind the main spring without using the winding handle 205 the motor/generator MG1 will act as a motor and the direction of all of the gears is reversed. The description of the operation of this assembly has been previously described in FIG. 25.

Figure 27:
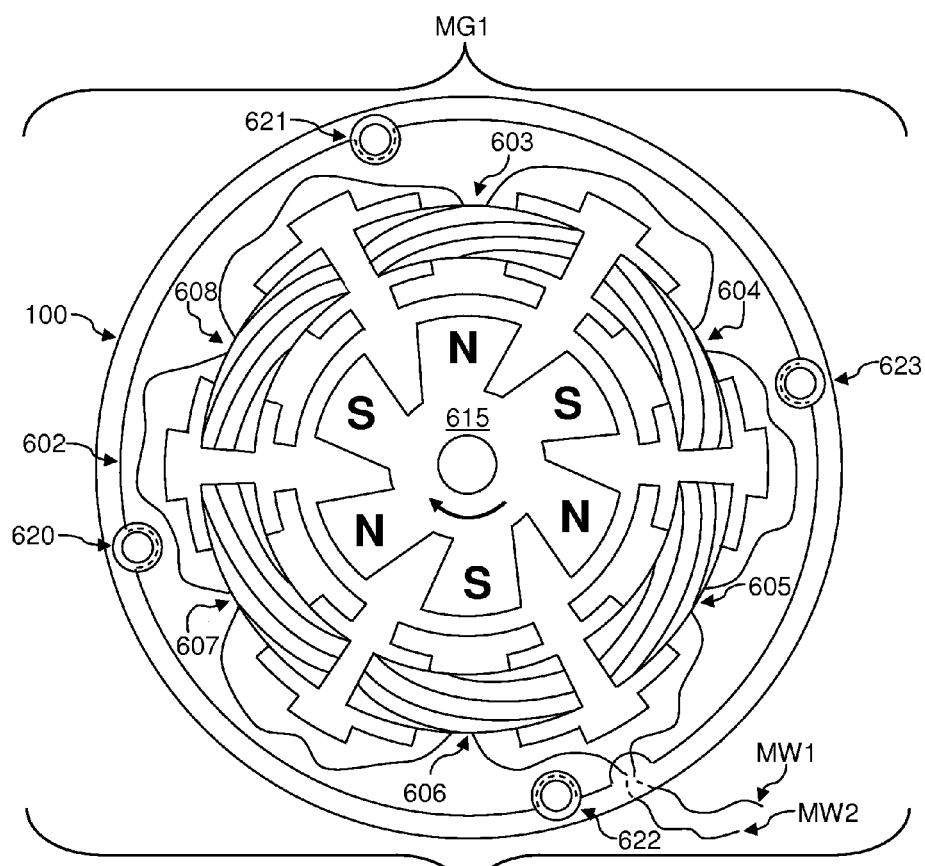
FIG. 27 shows a top view of the motor/generator.

FIG. 27 is a top view of one embodiment of the invention showing the motor/generator assembly MG1 where 100 is the exterior housing, 602 is the laminated steel stator core, 603, 605, and 607 are wound copper wire stator coils in one direction and 604, 606, and 608 are wound copper wire stator coils in the opposite direction connected in series and connected with stator wirers MW1 and MW2, producing an Alternating Current output, which are connected to the lower pc board via J7 shown in FIG. 31. 620-623 are 4 non-threaded hollow upper spacers detailed in FIG. 34. 615 is the permanent magnet rotor for the motor/generator MG1 the arrow indicates the direction of rotation in the generator mode when turned by the main spring 307 thru the gear chain, the rotation is reversed in the motor mode when the AC adapter is plugged in to rewind the main spring without using the winding handle 205. The non-symmetric shape of the poles of the permanent magnet rotor 615 are designed to force the rotor to rotate counter-clockwise, viewed from the top, when used as a motor. This has minimal effect when used as a generator where the rotation is clockwise. It should be noted that there are many forms of motor/generators, for this embodiment of the invention this type has been incorporated due to the fact that there are no rotor brushes needed which will wear out over time.

Figure 28:
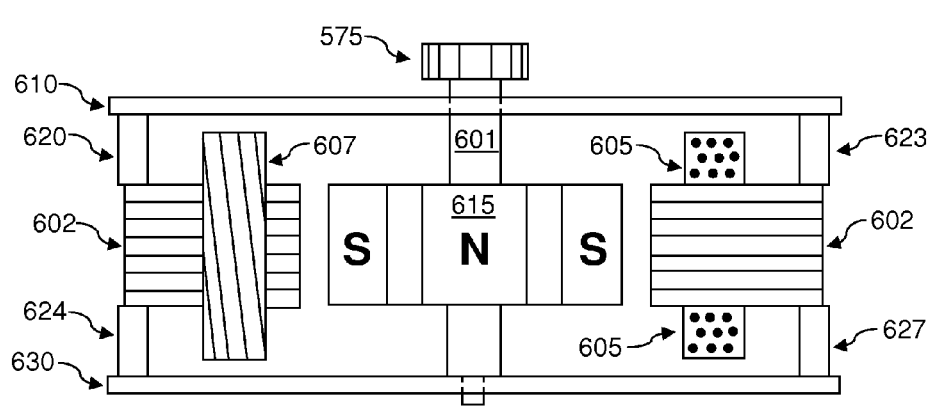
FIG. 28 shows a side view of the motor/generator.

FIG. 28 is a side cutaway view of one embodiment of the invention showing the motor/generator assembly MG1 where the motor/generator drive gear 575 turns the motor/generator drive shaft 601 and permanent magnet rotor 615. The motor/generator top plate 610 and upper pc board mounting plate 630 hold the laminated steel stator core 602 in place with 8 non-threaded hollow spacers 2 of the 4 upper spacers 620 and 623 and 2 of the 4 lower spacers 624 and 627 are shown in this view a detailed view of the spacers can be seen in FIG. 34. A side exterior view of 1 of the 6 wound copper wire stator coils 607 and a side cutaway view of another one of the coils 605 is shown.

Figure 29:
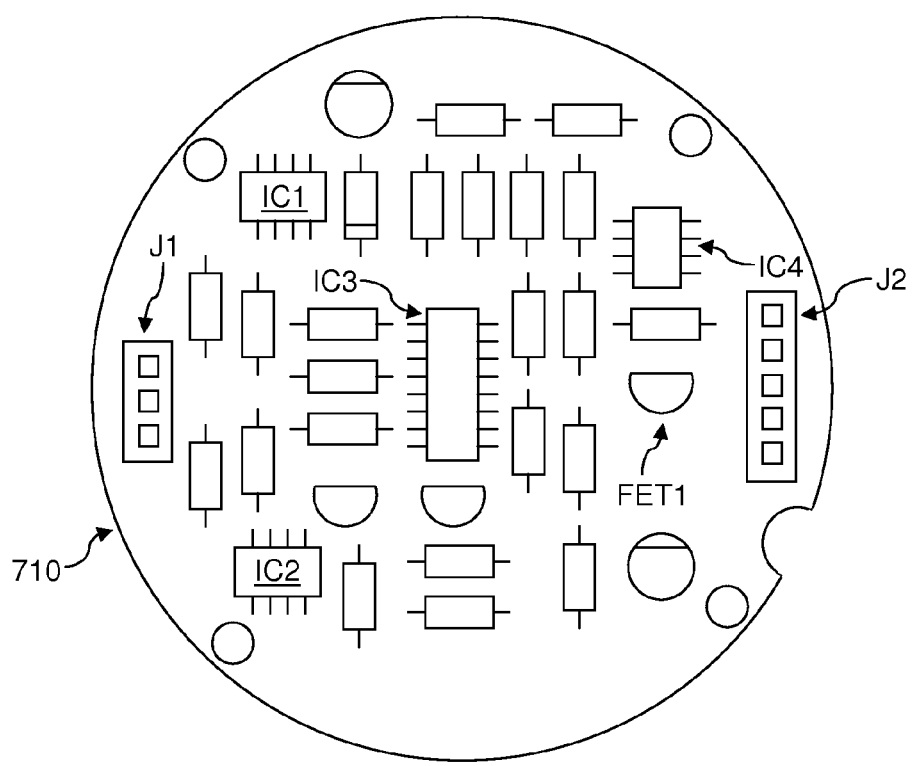
FIG. 29 shows a bottom view of the upper pc board.

FIG. 29 is a bottom view of one embodiment of the invention showing the upper pc board 710. For clarity the top view of this pc board is not shown as the mounted components face downwards as seen in FIG. 31. This is a partial list of the mounted components where IC1 is a nano-power under-voltage detector integrated circuit, IC2 is a nano-power over-voltage detector integrated circuit, IC3 is a FET voltage reversing switching matrix, IC4 nano-power under-voltage detector integrated circuit, FET1 is a field effect transistor, J1 is a connector, and J2 is a connector. A detailed description of this pc board is described in FIG. 35.

Figure 30:
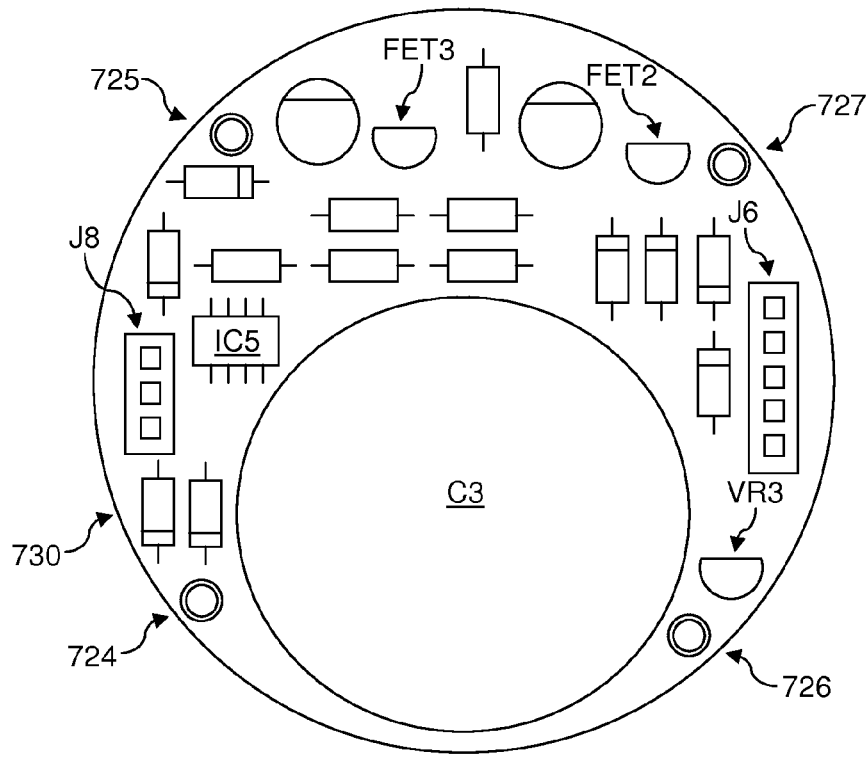
FIG. 30 shows a top view of the lower pc board.

FIG. 30 is a top view of one embodiment of the invention showing the lower pc board 730. This is a partial list of the mounted components where IC5 is a nano-power under-voltage detector integrated circuit, FET2 is a field effect transistor, FET3 is a field effect transistor, J6 is a connector, and J8 is a connector, and C3 is a 1 Farad storage capacitor. 724-727 are 4 non-threaded hollow spacers detailed in FIG. 34. A detailed description of this pc board is described in FIG. 35.

FIG. 31 is a side view of one embodiment of the invention showing the internal wiring of the full assembly to the pc boards and battery terminals where J3 supplies 3 Volt power to metal crimp lug 110, which is secured to the 3 volt positive battery terminal 102 with terminal screw 111 as seen in FIG. 6, via wire VW3 and power to LED1 via wire LW2. The other end of LED1 connects to J7 via wire LW3. The motor/generator MG1 connects to J7 via wirers MW1 and MW2. The bi-directional solenoid 408 connects to J3 via wirers CW1 and CW2. J3 plugs into J1 on the upper pc board 710. J7 plugs into J8 on the lower pc board 730. J4 plugs into J2 on the upper pc board 710 and J5 plugs into J6 on the lower pc board 730. C3 is the 1 Farad storage capacitor mounted on the lower pc board 730. 726 is 1 of the 4 non-threaded hollow spacers detailed in FIG. 34 which separate the upper and lower pc boards. J10 is the Mini USB power output connector mounted to the bottom of the lower pc board 730. S1 is the on/off switch for LED1 mounted to the bottom of the lower pc board 730. J9 is the AC adapter power input jack mounted to the bottom of the lower pc board 730. 780 is the external negative battery terminal soldered to the lower pc board 730. A detailed description of the function of these components is described in FIG. 35.

Figure 32:
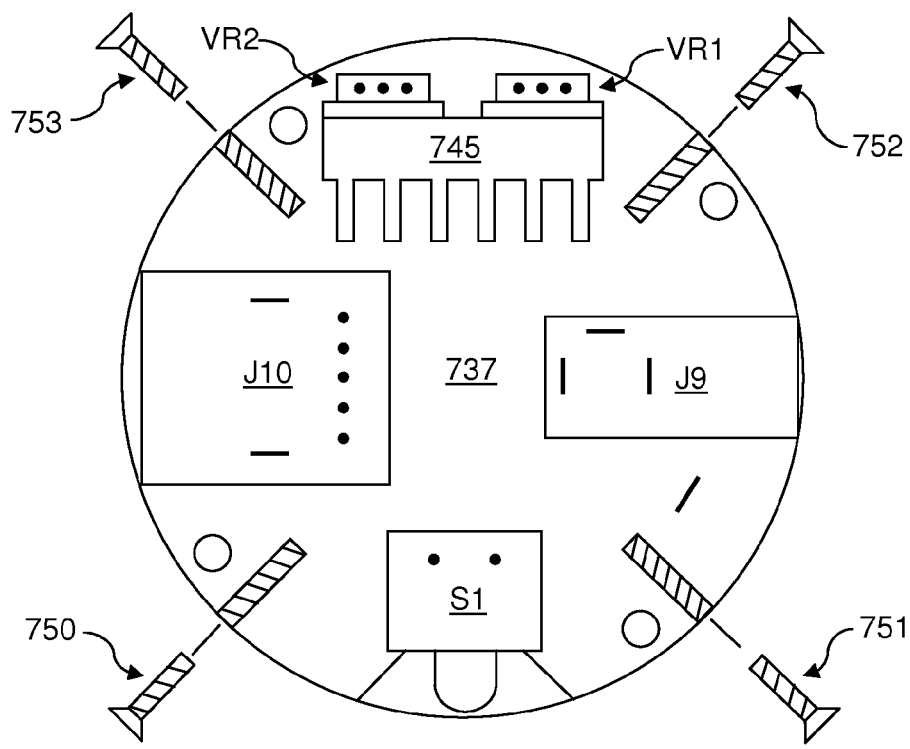
FIG. 32 shows a top view of the lower pc board connectors, LED on off switch, voltage regulators and side assembly screws.

FIG. 32 is a top view of one embodiment of the invention showing the lower plastic insert 737, the 4 external mounting screws 750-753, aluminum heat sink 745, voltage regulators VR1 and VR2, the Mini USB power output connector J10, the on/off switch for LED1 S1, and the AC adapter power input jack J9.

Figure 33:
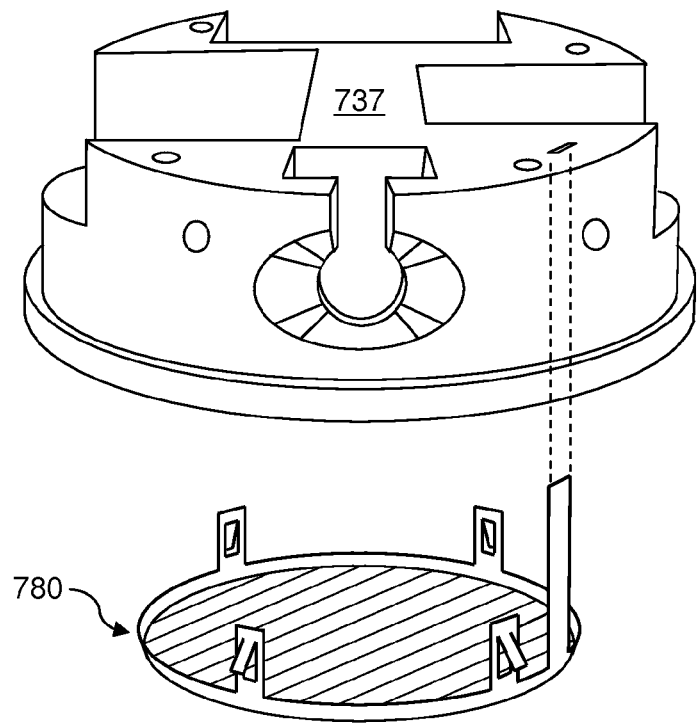
FIG. 33 shows a perspective view of the lower plastic insert and negative battery terminal.

FIG. 33 is a perspective view of one embodiment of the invention showing the lower plastic insert 737 and the external negative battery terminal 780. The lower plastic insert 737 acts an insulator between the exterior housing 100 and the negative battery terminal 780. 780 is a solid metal beveled plate with 4 locking tabs that secure it in place in slots in the bottom of 737. The long metal tab slides thru a slot in 737 and is soldered to the lower pc board 730.

FIG. 34 is a perspective view of one embodiment of the invention showing the mechanical assembly of the lower section of the device where 410 is the top clutch mounting plate, 420-423 are 4 threaded spacers press fit into 410, 510 is the top gear chain mounting plate, 520-523 are 4 non-threaded hollow spacers, 610 is the motor/generator top plate, 620-623 are 4 non-threaded hollow upper spacers, 602 is the laminated steel stator core, 624-627 are 4 non-threaded hollow lower spacers, 630 is the upper pc board mounting plate, 720-723 are 4 non-threaded hollow spacers, 710 is the upper pc board, 724-727 are 4 non-threaded hollow spacers, 730 the lower pc board, 737 is the lower plastic insert, and 740-743 are 4 long counter sunk assembly screws that screw into the 4 threaded spacers 420-423 holding the lower assembly together. The tension created by the torsion of the main spring is transferred from the 4 top assembly screws 105-106 shown in FIG. 5 to the exterior housing 100 to the 4 external mounting screws 750-753 shown in FIG. 32 into the lower plastic insert 737 and the 4 long counter sunk assembly screws 740-743. This was designed to make it unnecessary to run assembly screws from the top to the bottom of the assembly maximizing the size of the main spring 307. The 4 long counter sunk assembly screws 740-743 are outside the dimension of the negative battery terminal 780 shown in FIG. 33 and make no electrical connection keeping the exterior housing 100 and internal metal components isolated from power or ground.

Figure 35:
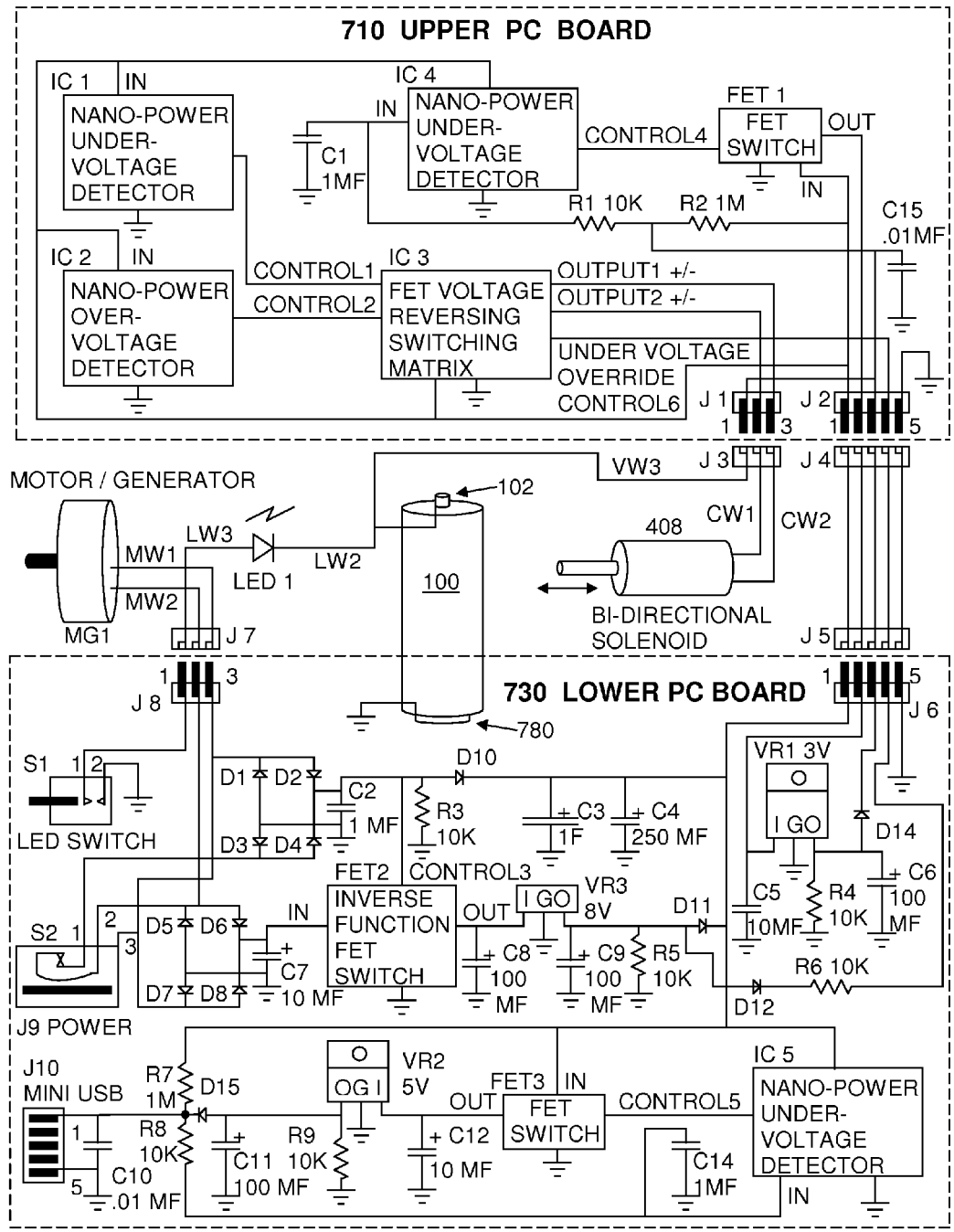
FIG. 35 shows a schematic for the upper pc board, lower pc board, motor/generator, bi-directional solenoid, LED, 3 volt positive battery terminal, negative battery terminal and internal wiring.

FIG. 35 is a schematic of one embodiment of the invention showing the upper pc board 710, the lower pc board 730, the motor/generator MG1, the light emitting diode LED1, the bi-directional solenoid 408, the positive battery terminal 102, the negative battery terminal 780, and connectors J3,J4,J5 and J7.

MG1 connects to 730 via wirers MW1, MW2, J7 plugged into J8. When operating as a generator MG1 supplies AC voltage to bridge rectifiers D5, D6, D7, and D8 converting the AC to DC charging the 10 mf capacitor C7 and thru S2 incorporated within J9, normally closed, supplies AC voltage to bridge rectifiers D1, D2, D3, and D4 converting the AC to DC charging the 1 mf capacitor C2 and thru isolation diode D10, charges the 1 Farad storage capacitor C3 and 250 mf capacitor C4. When operating as a motor MG1 receives AC voltage via J8 directly from an external AC adaptor when plugged into J9 opening switch S2, bridge rectifiers D5, D6, D7, and D8 also receives power from J9 converting the AC to DC charging the 10 mf capacitor C7 however S2 is now open and no power is supplied to D1, D2, D3, and D4 causing the 1 mf capacitor C2 to quickly discharge thru the 10K resistor R3 and isolation diode D10 blocks any return charge from C3 and C4 and prevents R3 from draining the charge on C3 and C4 in standby mode. This state turns ON the inverse function field effect transistor switch FET2 as when a high state is detected on the CONTROL3 lead the switch is OFF and when a low state is detected the switch is turned ON. This supplies DC voltage to the 100 mf capacitor C8, 8 Volt voltage regulator VR3, 100 mf capacitor C9, 10K load resistor R5, and isolation diodes D11 and D12. D11 maintains the charge on C3 and C4 and prevents R5 from draining the charge when VR3 is OFF. The ON state from D12 goes thru 10K resistor R6, connectors J6,J5,J4,J2 to the under voltage override CONTROL6 to the FET voltage reversing switching matrix IC3. Using the charge maintained on C3 and C4 this matrix engages the bi-directional solenoid 408, in the pulled mode, via J1,J3 and wirers CW1 and CW2 in the under-voltage detected mode shown in FIG. 20 releasing the clutch 480 allowing MG1 to turn winding the main spring 307. The external AC adapter has a current detector that turns it OFF when 307 is fully wound.

The FET voltage reversing switching matrix IC3 functions in the following way. There are 3 control inputs, 2 outputs, and power and ground designed to activate the bi-directional solenoid 408 in one of 2 directions. When the voltage on C3 and C4 falls to 7 volts the nano-power under-voltage detector IC1 sends an ON state via the CONTROL1 input to IC3 which sends a positive (+) voltage to OUTPUT1 and a ground state (−) to OUTPUT2 thru J1, J3 and wirers CW1 and CW2 pulling the bi-directional solenoid magnet 412 IN as seen in FIG. 20 releasing the clutch 480 allowing MG1 to turn acting as a generator recharging C3 and C4. This is the same mode for using MG1 as a motor described in the previous paragraph. When the voltage on C3 and C4 rises to 10 volts the nano-power over-voltage detector IC2 sends an ON state via the CONTROL2 input to IC3 which sends a ground state (−) voltage to OUTPUT1 and a positive (+) voltage to OUTPUT2 thru J1, J3 and wirers CW1 and CW2 pushing the bi-directional solenoid permanent magnet 412 OUT as seen in FIG. 19 locking the clutch 480 preventing MG1 from turning to protect the storage capacitors and other electronic components from over voltage.

The mini USB connector J10 is for charging cell phones and powering numerous external devices that are compatible with USB power, functions in the following way. A static voltage is maintained on the positive voltage pin on J10 via 1 M resistor R7 charging the 0.01 mf capacitor C10. When an external load is connected the voltage drop is detected by the input of the nano-power under-voltage detector IC5 via 10K resistor R8 lowering the charge on the 1 mf capacitor C14 which sends an ON state via CONTROL5 to field effect transistor switch FET3 charging the 10 mf capacitor C12 and powering the 5 Volt voltage regulator VR2 charging the 100 mf capacitor C11 with 10K load resistor R9 passing thru isolation diode D15 powering the connected external device. The threshold level for IC5 is set for 6 volts assuring that it will not turn off when the voltage regulator VR2 turns ON. When the external load is removed the static voltage at IN on IC5 will rise to the minimum 7 volt charge maintained on C3 and C4 turning VR2 OFF. This greatly reduces the standby drain on C3 and C4 along with isolation diode D15 blocking the drain from R9.

All aspects of the schematic and mechanics of the invention are designed to minimize the static load on capacitors C3 and C4 extending the time the device can retain the ability to provide power without the need to rewind the main spring 307. In the embodiment described herein the length of time between brief activation of the generator MG1 by activation of bi-directional solenoid 408 when under-voltage is detected by IC1 can be calculated with the following constants where:

T=The time in seconds between recharge cycles.
E=10 Volts, The full charge starting point.
V=7 Volts, The low voltage detection point.
R=1,500,000 (1.5 M) ohms, The effective restive load.
C=1 Farad, The storage capacitance.
Using the formula:

$T=RC \log E/V$ $T=1,500,000 \times 1 \times \log 10/7$ $T=1,500,000 \times \log 1.428571429$ $T=1,500,000 \times 0.356674944$ $T=535,012 \text{ Seconds}$ This equates to 8,916.9 minutes or 148.6 hours or about 6.2 days between brief recharge cycles allowing the device to retain the ability to provide power for months without rewinding. It should be noted that the calculations for this embodiment of the invention are for example and clarity of the design. Other variations may have shorter or much longer time periods.

When the device is installed into an external device as a substitute for electrochemical batteries the positive battery terminal 102 and light emitting diode LED1 receive their power from the same 3 volt source which functions in the following way. A static voltage is maintained on the positive battery terminal 102 and LED1 thru wirers LW2 and VW3, and connectors J3 and J1 via 1 M resistor R2 charging the 0.01 mf capacitor C15. When an external load is detected the voltage drop is detected by the input of the nano-power under-voltage detector IC4, via 10K resistor R1 reducing the charge on the 1 mf capacitor C1, which sends an ON state via CONTROL4 to field effect transistor switch FET1 charging the 10 mf capacitor C5 via a connection thru J2, J4, J5 and J6 powering the 3 Volt voltage regulator VR1 charging the 100 mf capacitor C6 with 10K load resistor R4 passing thru isolation diode D14 powering the connected external device or LED1 which is turned on via wire LW3 to J7 and J8 connected to LED switch S1 which is normally open (OFF) and when switched to ground (ON) is detected as an external load turning LED1 (ON) allowing the device to be used as a flashlight. The threshold input level for IC4 is set for 4 volts assuring that it will not turn off when the voltage regulator VR1 turns ON. When the external load is removed the static voltage at the IN on IC4 will rise to the minimum 7 volt charge maintained on C3 and C4 turning VR1 OFF. This greatly reduces the standby drain on C3 and C4 along with isolation diode D14 blocking the drain from R4. Additionally the FET switches used have an extremely high off state resistance providing virtually no drain on C3 and C4 in standby mode.

What is claimed is:

1. An apparatus comprising:
   a) a hand crank attached to a main spring;
   b) the main spring attached to a first chain of gears;
   c) the first chain of gears attached to a generator;
   d) the generator attached with wires to an electronic circuit;
   e) the first chain of gears attached to a second chain of gears;
   f) the second chain of gears attached to a clutch wheel;
   g) the clutch wheel attached to a clutch mechanism, the clutch mechanism comprising a clutch latching mechanism and a bi-directional solenoid;
   h) the clutch latching mechanism linked to the hand crank by the action of removing the winding handle from the clutch mechanism when unfolding the hand crank into the winding position;
   i) the bi-directional solenoid attached with wires to an electronic circuit controlling the activation of the clutch mechanism;
   j) the electronic circuit controlling the activation of the bi-directional solenoid, storing electricity, and providing multiple output voltages;
   k) the electronic circuit further comprising:
      a) a storage capacitor;
      b) a first under-voltage detector to detect a low voltage condition in the storage capacitor;
      c) a second under-voltage detector to detect a load on the primary power output
      d) a third under-voltage detector to detect a load on a USB power output connector;
      e) an over-voltage detector to protect the electronic components;
      f) the generator attached to the electronic circuit;
      g) a voltage reversing switching matrix attached to the bi-directional solenoid.

2. The apparatus of claim 1 wherein said hand crank is attached to the main spring with two gears to reduce the amount of force required to wind the main spring.

3. The apparatus of claim 1 wherein said clutch latching mechanism is engaged by the action of unfolding the hand crank into the winding position by the movement of the winding handle having an incorporated detent to push a roller setting a latch that un-locks the clutch allowing the main spring and generator to rotate when there is no stored power available to activate the bi-directional solenoid to un-lock the clutch.

4. The apparatus of claim 1 wherein said main spring stores kinetic energy provided by an external winding force to generate electricity on demand.

5. The apparatus of claim 1 wherein said electronic circuit additionally uses the voltage reversing switching matrix to reverse the function of said generator using it as a motor with the use of the internal switch contained within the AC adapter power input jack activated by plugging in an external AC adaptor controlling the bi-directional solenoid and clutch mechanism to un-lock the clutch allowing the motor/generator to rewind the mainspring without the need to use the hand crank or clutch latching mechanism.

6. The apparatus of claim 1 wherein said first chain of gears increases the rotation ratio between the main spring and generator optimizing the power generating efficiency.

7. The apparatus of claim 1 wherein said second chain of gears further increases the rotation ratio from the first chain of gears to the clutch mechanism allowing a minimal force provided by a clutch locking band and spring to lock the clutch preventing the main spring and generator from turning.

8. The apparatus of claim 1 wherein said bi-directional solenoid and clutch mechanism maintains its ability to provide electricity from the main spring for extended periods of time when not in use by locking the main spring and generator when no power is applied to the bi-directional solenoid and clutch.

9. The apparatus of claim 1 wherein said electronic circuit detects an over-voltage condition with the over-voltage detector activating the voltage reversing switching matrix to activate the bi-directional solenoid releasing the clutch latching mechanism locking the clutch and stopping the main spring and generator from turning preventing overcharging of the storage capacitor and protecting the other electronic components.

10. The apparatus of claim 1 wherein said electronic circuit detects a low voltage condition in the storage capacitor with the first under-voltage detector activating the voltage reversing switching matrix to activate the bi-directional solenoid and clutch mechanism periodically un-locking the clutch allowing the main spring and generator to rotate providing power to maintain the standby voltage.

11. The apparatus of claim 1 wherein said electronic circuit incorporates independent second and third under-voltage detectors respectively to activate the 3 Volt voltage regulator or the 5 Volt voltage regulator for the 3 Volt positive and negative battery terminals or the 5 Volt USB power output connector only when an external load is detected reducing the drain on the storage capacitor extending the time the apparatus can provide electricity before re-winding.

12. The apparatus of claim 1 wherein said electronic circuit incorporates the second under-voltage detector to regulate the periodic activation of the generator to supply power when needed to power external devices and to additionally power an internal LED flashlight turned on and off with a switch.

13. The apparatus of claim 1 for generating electricity by electro-mechanical means packaged in the form and dimensions of two standard C or D sized batteries stacked one on top of the other allowing the apparatus to be installed into and power devices currently using electro-chemical batteries.

14. The apparatus of claim 13 further comprising an exterior housing, exterior top plate, 3 volt positive battery terminal, beveled plastic insulator, lower plastic insert, and negative battery terminal.

15. An apparatus for generating electricity by electro-mechanical means comprising a winding handle to wind a mainspring, the mainspring to store energy and turn a chain of gears attached to a generator and a clutch mechanism, the generator to produce electricity from the mainspring, the clutch mechanism to regulate the operation of the generator and an electronic circuit to control the activation of the clutch mechanism using a bi-directional solenoid, store electricity in a capacitor, and provide single or multiple output voltages for powering external devices, and wherein the bi-directional solenoid requires zero power to secure the clutch mechanism and power load detection to release said clutch to activate the generator.

16. The apparatus of claim 15 wherein said generator can additionally be connected to an external power source allowing the generator to act as a motor in order to rewind the mainspring without the need to use the winding handle.

* * * * *